(12) United States Patent
Zafiroglu et al.

(10) Patent No.: US 11,377,766 B2
(45) Date of Patent: Jul. 5, 2022

(54) DELAMINATION-RESISTANT BULKY NEEDLE-PUNCHED STRUCTURES

(71) Applicant: Engineered Floors LLC, Dalton, GA (US)

(72) Inventors: Dimitri Zafiroglu, Centreville, DE (US); Stephen Tsiarkezos, Elkton, MD (US); John Joseph Matthews Rees, Chattanooga, TN (US)

(73) Assignee: ENGINEERED FLOORS LLC, Dalton, GA (US)

( * ) Notice: Subject to any disclaimer, the term of this patent is extended or adjusted under 35 U.S.C. 154(b) by 205 days.

(21) Appl. No.: 15/647,935

(22) Filed: Jul. 12, 2017

(65) Prior Publication Data

US 2018/0014678 A1    Jan. 18, 2018

Related U.S. Application Data

(60) Provisional application No. 62/362,979, filed on Jul. 15, 2016.

(51) Int. Cl.
*D04H 1/48* (2012.01)
*B32B 5/06* (2006.01)
(Continued)

(52) U.S. Cl.
CPC .......... *D04H 1/48* (2013.01); *A47G 27/0206* (2013.01); *A47G 27/0468* (2013.01); *B32B 3/16* (2013.01);
(Continued)

(58) Field of Classification Search
CPC .......... D06C 15/00; D06C 15/12; D04H 1/00; D04H 1/40; D04H 1/44; D04H 1/46;
(Continued)

(56) References Cited

U.S. PATENT DOCUMENTS 3,925,130 A * 12/1975 Brown .................. D04H 11/08
                                                                        156/148
3,940,522 A *  2/1976 Wessells ................ D01D 5/253
                                                                          428/17
(Continued)

FOREIGN PATENT DOCUMENTS

GB        915682 A  *  1/1963  ............... D04H 1/48
GB       1433427 A  *  4/1976  ............... D04H 1/48

OTHER PUBLICATIONS

Definitions of "bonding," "needled fabrics," and "needle loom," Complete Textile Glossary, 2001. Celanese Acetate.*

*Primary Examiner* — Cheryl Juska
(74) *Attorney, Agent, or Firm* — Patent Portfolio Builders PLLC

(57) ABSTRACT

Stabilizing a textile sheet structure was achieved by forming a plurality of discrete fiber tufts extending from a first face of a fibrous layer of the textile sheet structure, through the fibrous layer and beyond a second face opposite the first face. Each discrete fiber tuft included a plurality discrete fibers. Each discrete fiber tuft was anchored to the first face and the second face of the fibrous layer by joining together the plurality of each discrete fiber tuft at the first face and the second face and bonding the joined plurality of discrete fiber tuft to the first face and the second face.

23 Claims, 14 Drawing Sheets

(51) Int. Cl.
- B32B 7/12 (2006.01)
- D04H 1/46 (2012.01)
- D04H 13/00 (2006.01)
- A47G 27/02 (2006.01)
- A47G 27/04 (2006.01)
- B32B 3/16 (2006.01)
- B32B 5/22 (2006.01)
- B32B 27/12 (2006.01)
- B32B 7/02 (2019.01)
- B32B 5/26 (2006.01)
- B32B 29/00 (2006.01)
- D04H 1/558 (2012.01)
- B32B 5/02 (2006.01)
- D04H 1/485 (2012.01)
- D04H 1/00 (2006.01)
- D04H 11/08 (2006.01)
- B32B 29/02 (2006.01)
- D04H 3/105 (2012.01)
- D04H 1/541 (2012.01)
- D04H 1/70 (2012.01)
- D04H 1/488 (2012.01)
- D04H 1/498 (2012.01)
- D04H 3/10 (2012.01)
- B32B 17/10 (2006.01)

(52) U.S. Cl.
CPC .............. *B32B 5/022* (2013.01); *B32B 5/024* (2013.01); *B32B 5/026* (2013.01); *B32B 5/06* (2013.01); *B32B 5/22* (2013.01); *B32B 5/26* (2013.01); *B32B 7/02* (2013.01); *B32B 27/12* (2013.01); *B32B 29/005* (2013.01); *B32B 29/02* (2013.01); *D04H 1/00* (2013.01); *D04H 1/46* (2013.01); *D04H 1/485* (2013.01); *D04H 1/488* (2013.01); *D04H 1/498* (2013.01); *D04H 1/541* (2013.01); *D04H 1/558* (2013.01); *D04H 1/70* (2013.01); *D04H 3/102* (2013.01); *D04H 3/105* (2013.01); *D04H 11/08* (2013.01); *D04H 13/005* (2013.01); *B32B 7/12* (2013.01); *B32B 17/10412* (2013.01); *B32B 2250/02* (2013.01); *B32B 2250/03* (2013.01); *B32B 2250/04* (2013.01); *B32B 2250/20* (2013.01); *B32B 2262/12* (2013.01); *B32B 2307/732* (2013.01); *B32B 2307/734* (2013.01); *B32B 2471/00* (2013.01); *B32B 2471/02* (2013.01)

(58) Field of Classification Search
CPC D04H 1/48; D04H 1/488; D04H 3/00; D04H 3/102; D04H 3/105; D04H 11/00; D04H 11/08; D04H 1/541; D04H 13/001; D04H 13/005; D04H 1/485; D04H 1/498; B32B 5/022; B32B 5/06; B32B 5/26; B32B 7/12; B32B 27/12; B32B 2307/734
See application file for complete search history.

(56) References Cited

U.S. PATENT DOCUMENTS

| | | | |
|---|---|---|---|
| 4,379,189 A * | 4/1983 | Platt | D04H 1/48 156/72 |
| 4,390,582 A * | 6/1983 | Pickens, Jr. | D04H 11/08 156/72 |
| 7,514,026 B1 | 4/2009 | Zafiroglu | |
| 8,216,659 B2 | 7/2012 | Zafiroglu | |
| 2006/0257616 A1 * | 11/2006 | Hendrix | B32B 5/022 428/85 |

* cited by examiner

DELAMINATION-RESISTANT BULKY NEEDLE-PUNCHED STRUCTURES

CROSS-REFERENCE TO RELATED APPLICATIONS

The present application is a continuation of, and claims priority from, U.S. patent application Ser. No. 62/362,979 filed Jul. 15, 2016. The entire disclosure of that application is incorporated herein by reference.

TECHNICAL FIELD

Embodiments of the subject matter disclosed herein relate to textile sheets and floor coverings having needle-punched structures.

BACKGROUND

It is advantageous for a textile sheet such as a fabric or floorcovering to have functional surface layers providing aesthetics, wear resistance, barrier and antimicrobial and other properties. These functional surface layers may be combined with additional layers that provide different properties to the textile sheet, for example, layers with higher bulk and lower density, reinforcing or stabilizing layers, layers of films, scrims and glass nonwovens, layers formed with short or recycled fibers and layers of bulky felts or foams. These additional layers may lack the durability and cohesive properties of the outer functional surface layers.

Various layers can be combined in a textile sheet by needle-punching fibers to penetrate the layers. However, unless the layers are highly-entangled, joined by a high number of needle penetrations per unit area, tightly and solidly bound with adhesives, joined by sewing or stitching, or stitch-bonded with yarns, the composite textile sheet can delaminate, collapse or wear quickly. One approach is to increase the total number of needle penetrations per unit area, which improves surface-stability and delamination resistance, but densifies the textile sheet. Densifying the textile sheet is undesirable and results in a loss of thickness and cushion. Bonding the layers of the textile sheet using adhesives or low-melting fibers located within the layers of the textile sheet also prevents delamination, but adds undesirable weight and stiffness, and densifies the textile sheet.

Textile nonwoven sheets of uniform composition, e.g., needle-punched felts, may contain blends of long or highly crimped fibers and short or low-crimped fibers, such as recycled fibers. These textile nonwoven sheets provide satisfactory bulk and cushion, but unless they are highly densified, they lack surface stability and delamination resistance. Surface stability and delamination resistance can be improved with heavy needle-punching, or with activated low-melt fibers incorporated into the textile non-woven sheets and subjected to heat, or with adhesive impregnation into the textile nonwoven sheets. All these methods will also contribute to stiffness, loss of bulk, or increased weight.

Needle-punching of felts usually starts with a bulky structure containing a plurality of carded or air laid layers. These layers are usually subjected to a pre-consolidation stage, or "tacking", to reduce thickness and bulk and to prepare layers for the "finishing" stage. In the finishing stage, fine needles entangle and fortify the layers and impart surface stability and dimensional stability. Surface stability and dimensional stability can also be improved, with little to no loss of bulk and cushion, with added adhesive. However, cut edge stability and delamination resistance is not improved significantly unless the needle-punched felt is also compacted or large amounts of adhesive are used. Compacting or high adhesive use result in a stiff and dense needle-punched felt. Additional needle-punching, which results in a high number of needle penetrations per unit area, is also an option that can improve integrity. Additional needle-punching, however, significantly reduces thickness and cushion. Stitching the needle-punched felts also significantly reduces bulk and cushion.

Therefore, a method of constructing delamination-resistant composite layered structures that enclose, contain or encapsulate softer, or less coherent, or adhesively unconnected special mid-layers, or short and less coherent fibers, with a minimum loss of bulk and cushion, is desired.

SUMMARY

Exemplary embodiments are directed to textile sheet structures having improved surface stability, edge integrity, dimensional stability and delamination resistance and to methods for making these textile sheet structures. Improved stability, integrity and delamination resistance are achieved without a substantial loss of bulk or cushion. Widely-spaced, coarse needle-punching needles are used to drive the ends of fibers or fiber tufts from the needle-entrance surface through the textile sheet structure. The coarse needles contain a plurality of barbs, and each barb grabs and pushes parts of a plurality of fibers from a first outer face of the fibrous layer through a second outer face opposite the first face. These tufts protruding through the opposite face may also include loops or ends of multiple staple fibers or continuous filaments driven by the needles. The remainder or tail ends of most of the inserted fibers continue to reside along the needle-entrance surface. Thus, the fiber tufts bridge across the two surfaces.

The individual fibers in each fiber tuft bridging across the two surfaces are lightly pressed, collapsed and joined to the fibers of the adjacent collapsed tufts and to the fibers laying along the first and second faces. The joined fibers are then bonded to the adjacent fibers on both faces, thus forming a virtual bridging or tying network akin to a stitching network. Bonding is accomplished by providing adhesive at the two surfaces. Adhesive may be in the form of low-melt fibers already present in the fibrous sheet or solid adhesives added to the two surfaces before needling, melting or setting the adhesives. Alternately adhesive may be added after needling in a solid sheet form or as a powder or liquid.

The entire process attaches the individual, discrete and spaced fiber tufts to each other and to both the two faces of the fibrous layer of the textile sheet structure. Despite using spacing between needle insertions that is very large by normal needle-punching standards, the parts of the fiber tufts driven through and past the opposing surface extend to a length beyond the spacing of the insertion of the tufts, allowing the protruding fibers to collapse sidewise and overlap with the fibers of adjacent tufts. Therefore, the entire textile sheet structure is held together in a manner similar to stitching, by shallow surface bonding of the ends of bridging fibers and fiber tufts along the two surfaces without the use of excessive heat or pressure.

In one embodiment, surface bonding of the fiber tufts is enhanced by incorporating lower melting fibers in the fibrous layer. These lower melting fibers are driven through the fibrous layers along with the remaining fibers and incorporated into the fiber tufts that are subsequently anchored to both faces of the fibrous layer using heat and minimal pressure.

In another embodiment, low-melting fibrous or non-fibrous adhesive layers in low-melt solid form are placed on one or both the faces of the fibrous layer or layers of the textile sheet structure. These adhesive layers can be applied to the faces either before or after needle-punching of the original fibrous layer with the widely-spaced coarse needles. In one embodiment, layers of adhesive in liquid form are added to the first and second faces of the fibrous layer or textile sheet structure after needle punching and before applying heat and light pressure. In one embodiment, fibers are driven by needle-punching with coarse needles from a fibrous face layer through a low melting layer and a pre-formed textile face layer. Joining, bonding and attachment are achieved with heat and pressure applied from at least one or both faces to activate the adhesive and attach all layers together. The resulting is contained in the upper and lower surfaces or "skins" and has a minimal negative effect on stiffness or cushion.

The resulting fibrous textile sheet structure, beyond improved surface stability, attains high cut-edge stability and high delamination resistance. This is achieved using a very low density of needle penetrations and resultant fiber tufts to connect the two surfaces, which are sufficient to impart surprisingly high delamination resistance as well as surprisingly high cut edge stability. Another unexpected result is that these improvements are achieved with minimal densification or loss of bulk and cushion. In addition, the fibrous textile sheet structure can encapsulate layers of short fibers and recycled fibers and selected reinforcing, cushioning, stabilizing or active fibrous or non-fibrous layers within the structure, without requiring that each or any internal layer be bonded to each or any adjacent layer.

Exemplary embodiments are directed to a method for stabilizing a textile sheet structure. A plurality of discrete fiber tufts are formed that extend along a first face of a fibrous layer of the textile sheet structure, through the fibrous layer and beyond a second face opposite the first face. Each discrete fiber tuft contains a plurality of discrete fibers. The plurality of discrete fibers includes staple fibers or continuous-filament fibers. In one embodiment, the fibrous layer defines a thickness between the first face and the second face, and each fiber in the plurality of discrete fibers has a length sufficient to span along the first face, through the thickness of the layer and beyond the second face.

Each discrete fiber tuft is anchored to the first face and the second face of the fibrous layer by joining together the plurality of discrete fiber tufts at the first face and the second face and bonding the joined plurality of discrete fiber tufts to the first face and the second face. In one embodiment, the plurality of discrete fiber tufts is formed to extend beyond the second face a distance of at least about 16 mm.

In one embodiment, forming the plurality of discrete fiber tufts involves needle punching fibers disposed on the first face through the fibrous layer and beyond the second face with coarse needles. Each coarse needle contains a plurality of barbs, and each barb engages a plurality of fibers with each needle punch through the fibrous layer. In one embodiment, each coarse needle is a 25-gauge or coarser, i.e., lower gauge, needle. In one embodiment, a needle board is used that contains the coarse needles spaced from each other by a distance of at least about 5 mm. In another embodiment, the coarse needles are spaced from each other by a distance of at least about 10 mm. In one embodiment, needle punching is conducted at a density of needle penetrations in the fibrous layer of less than about 25 penetrations per $cm^2$. In another embodiment, needle punching is conducted at a density of needle penetrations in the fibrous layer of less than about 20 penetrations per $cm^2$.

In one embodiment, a plurality of discrete opposite fiber tufts separate from the discrete fiber tufts is formed. The discrete opposite fiber tufts extend along the second face through the fibrous layer and beyond a first face. Each discrete opposite fiber tuft contains a plurality discrete fibers. Each discrete opposite fiber tuft is anchored to the first face and the second face of the fibrous layer by joining together the plurality of discrete opposite fiber tufts at the first face and the second face and bonding the joined plurality of each discrete opposite fiber tuft to the first face and the second face.

In one embodiment, the plurality of discrete fiber tufts is formed by needle punching fibers disposed on the first face through the fibrous layer and beyond the second face with coarse needles, and the plurality of discrete opposite fiber tufts is formed by needle punching fibers disposed on the second face through the fibrous layer and beyond the first face with coarse needles. Each coarse needle contains a plurality of barbs, and each barb engages a plurality of fibers with each needle punch through the fibrous layer. Needle punching is conducted at a density of needle penetrations in the fibrous layer of less than about 30 penetrations per $cm^2$.

In one embodiment, an adhesive layer is added to at least one of the first face and the second face. The adhesive layer is a polymer layer with a melting point that is lower than the melting point of the fibers in the fibrous layer. The plurality of discrete fiber tufts is formed by needle punching fibers disposed on the first face through the fibrous layer, beyond the second face and through the polymer layer with coarse needles, and the plurality of discrete opposite fiber tufts is formed by needle punching fibers disposed on the second face through the fibrous layer, beyond the first face and through the polymer layer with coarse needles.

In one embodiment, a plurality of fibrous layers is combined into a stack containing a top fibrous layer that includes the first face and a bottom fibrous layer that includes the second face. The plurality of discrete fiber tufts is formed to extend along the first face of the top fibrous layer of the textile sheet structure, through the plurality of fibrous layers and beyond the second face in the bottom fibrous layer. In one embodiment, the plurality of fibrous layers is two fibrous layers, and at least one intermediate layer is placed between the two fibrous layers. The plurality of discrete fiber tufts is formed extending along the first face of the top fibrous layer of the textile sheet structure, through the top fibrous layer, the at least one intermediate layer and the bottom fibrous layer and beyond the second face in the bottom fibrous layer. Suitable intermediate layers include, but are not limited to, a film, paper, scrim, nonwoven fabric, woven fabric, antifungal layers, antimicrobial layers, felts and combinations thereof.

In one embodiment, the fibrous layer includes bi-component high-melt/low-melt fibers, and the plurality of discrete fiber tufts is formed where the plurality of fibers in each fiber tuft includes the bi-component high-melt/low-melt fibers. In one embodiment, adhesive is added to at least one of the first face and the second face after forming the plurality of discrete fiber tufts, and that adhesive is activated.

Exemplary embodiments are also directed to a stabilized textile sheet structure containing a plurality of discrete fiber tufts extending along a first face of a fibrous layer of the textile sheet structure, through the fibrous layer and beyond a second face opposite the first face. Each discrete fiber tuft includes a plurality of discrete fibers. The individual fibers in the plurality of discrete fiber tufts are joined together at both the first face and the second face, and the joined plurality of discrete fiber tufts are bonded to the first face or second face to anchor each discrete fiber tuft to the first face and the second face of the fibrous layer.

In one embodiment, the stabilized textile sheet structure also includes a plurality of discrete opposite fiber tufts separate from the discrete fiber tufts and extending along the second face through the fibrous layer and beyond a first face. Each discrete opposite fiber tuft contains a plurality discrete fibers. The individual fibers in the plurality of each discrete opposite fiber tuft are joined together at both the first face and the second face, and the joined plurality of discrete opposite fiber tuft are bonded to the first face or second face to anchor each discrete opposite fiber tuft to the first face and the second face of the fibrous layer.

BRIEF DESCRIPTION OF THE DRAWINGS

The accompanying drawings, which are incorporated in and constitute a part of the specification, illustrate a plurality of embodiments and, together with the following descriptions, explain these embodiments.

DETAILED DESCRIPTION

Figure 1:
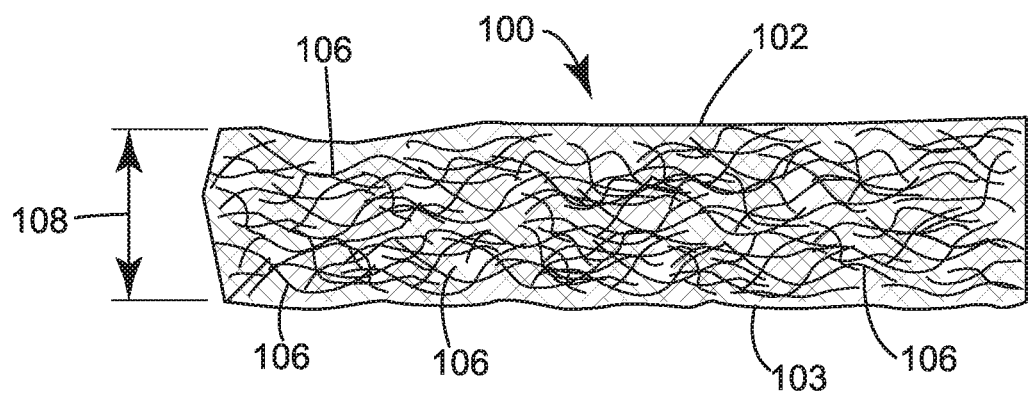
FIG. 1 is a schematic representation of an embodiment of a textile sheet structure containing a single fibrous layer.

The following description of the embodiments refers to the accompanying figures. The same reference numbers in different figures identify the same or similar elements. Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Exemplary embodiments are directed to the stabilization of a textile sheet structure that includes a fibrous layer, for example, a bulky felt that is re-needle-punched to a limited degree to preserve bulk and cushion or a relatively unstable felt that contains a large percentage of short fibers. These felts initially lack delamination resistance, edge stability, and surface stability. Stabilization in accordance with exemplary embodiments improves abrasion resistance, edge stability and delamination resistance without significant loss of bulk and cushion. The textile sheet structure can include a single fibrous layer or a plurality of fibrous and non-fibrous layers. With at least one fibrous layer supplying the fibers that are driven from this fibrous layer to form the protruding fiber tufts penetrating through the opposite face, the opposite or intermediate layers can be solid, non-fibrous and bonded or un-bonded to the rest of the textile sheet structure. In one embodiment, the textile sheet structure includes at least two felts in contact with each other. These felts are combined using the stabilization process in accordance with exemplary embodiments without significant loss of bulk in the fibrous layers.

In one embodiment, the plurality of fibrous layers is layered in direct contact with each other. Alternatively, additional intermediate layers are placed between adjacent fibrous layers or on the exterior faces of the top and bottom fibrous layers. In one embodiment, short recycled fiber layers are encapsulated between adjacent fibrous layers, i.e., between adjacent felts. In one embodiment, a stabilizing film, a stabilizing scrim or a bonded fibrous layer is inserted between adjacent fibrous layers, e.g., in the middle of a felt structure. In one embodiment, the additional intermediate layers are active layers located between adjacent fibrous layers or on the exterior faces of the fibrous layers. Suitable active layers include, but are not limited to, antimicrobial layers and antifungal layers. In addition to a single intermediate layer being placed between adjacent fibrous layers, a plurality of additional intermediate layers can be located between adjacent fibrous layers or on the external faces of the fibrous layers. Suitable additional intermediate layers include, but are not limited to, films, woven fabrics, knit fabrics, nonwoven fabrics, felts, papers, nets and combinations.

When combinations of additional intermediate layers are used, these combinations of layers are held by the fibers or fiber tufts connecting the two thinly but strongly bonded outer surfaces. In addition to being enclosed between adjacent fibrous layers, additional bondable or non-bondable layers can be attached to the bottom of the fibrous layer corresponding to the exit of the needles by driving fiber tufts through and causing the fiber tufts driven through the added layer on the opposite surface to collapse. Since the driven fiber tufts are closer to each other than the length by which the fiber tufts protrude, adjacent fiber tufts overlap and inter-bond, forming an external bonded fibrous layer on both faces and holding the added bottom layer.

Exemplary embodiments utilize discrete fiber tufts containing a plurality of fibers from the fibrous layers which are joined together and bonded to the outer faces of the fibrous layers to achieve the desired stabilization of the fibrous layers. Joining and bonding result in attachment, i.e., surface-bonding, of the fiber tufts to the outer faces of the fibrous layers. In one embodiment, attachment is achieved with heat and little to no applied pressure. In one embodiment, attachment of the fiber tufts to the exterior faces of the fibrous layers is enhanced by including low-melting fibers in the outer layers or exterior faces of the fibrous layers. These low-melting fibers are incorporated in the fiber tufts through the same process that creates the fiber tufts from the fibers of the fibrous layers being driven through the fibrous layer. These low-melt fibers provide bonding and attachment when heat is applied with low pressure to melt the exposed individual fibers in the fiber tufts and to bond the fiber tufts to each other and to the outer faces of the fibrous layers.

In one embodiment, at least one of the outer faces of the fibrous layers includes low-melt fibrous or non-fibrous elements, e.g., films or nonwoven layers, that are activated with low-pressure and heat. These additional low-melt layers can be added before or after the needle-punching and before applying surface heat or after needle punching followed by activation with low pressure. In one embodiment, an additional face layer is added to at least one of the outer faces of the fibrous layers. These additional face layers include pre-formed fibrous and non-fibrous face layers. Suitable additional face layers contain low melting fibers, adhesive fibers or resins. Alternatively, the additional face layers are pre-coated with adhesives, fitted with low-melt fibers or fitted with resins to achieve bonding of the outer faces simultaneously with lamination of the additional face layers to the outer faces of the fibrous layers. Suitable additional face layers include, but are not limited to, a woven textile, a knit textile, a tufted textile, a nonwoven textile, a flocked textile, a stitchbonded textile, a bonded nonwoven textile, an entangled nonwoven textile and a solid film scrim. In one embodiment, an adhesive layer is provided between the additional face layers and the outer faces of the fibrous layers. The resulting textile sheet structure is bonded by activating the adhesive layer with heat and low pressure applied from one or both sides to secure together the entire textile sheet structure.

Figure 2:
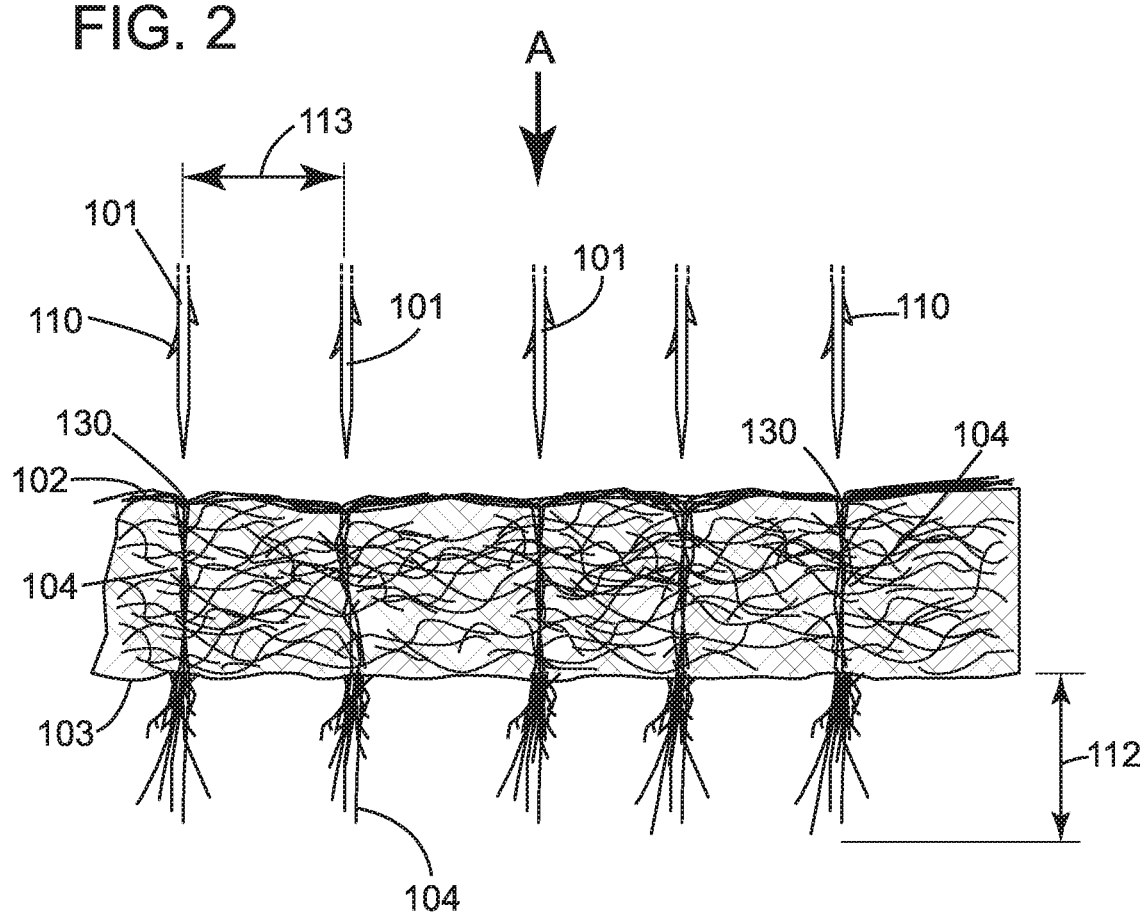
FIG. 2 is a schematic representation of the textile sheet structure of FIG. 1 stabilized with coarse needle punching from a single face.
Figure 3:
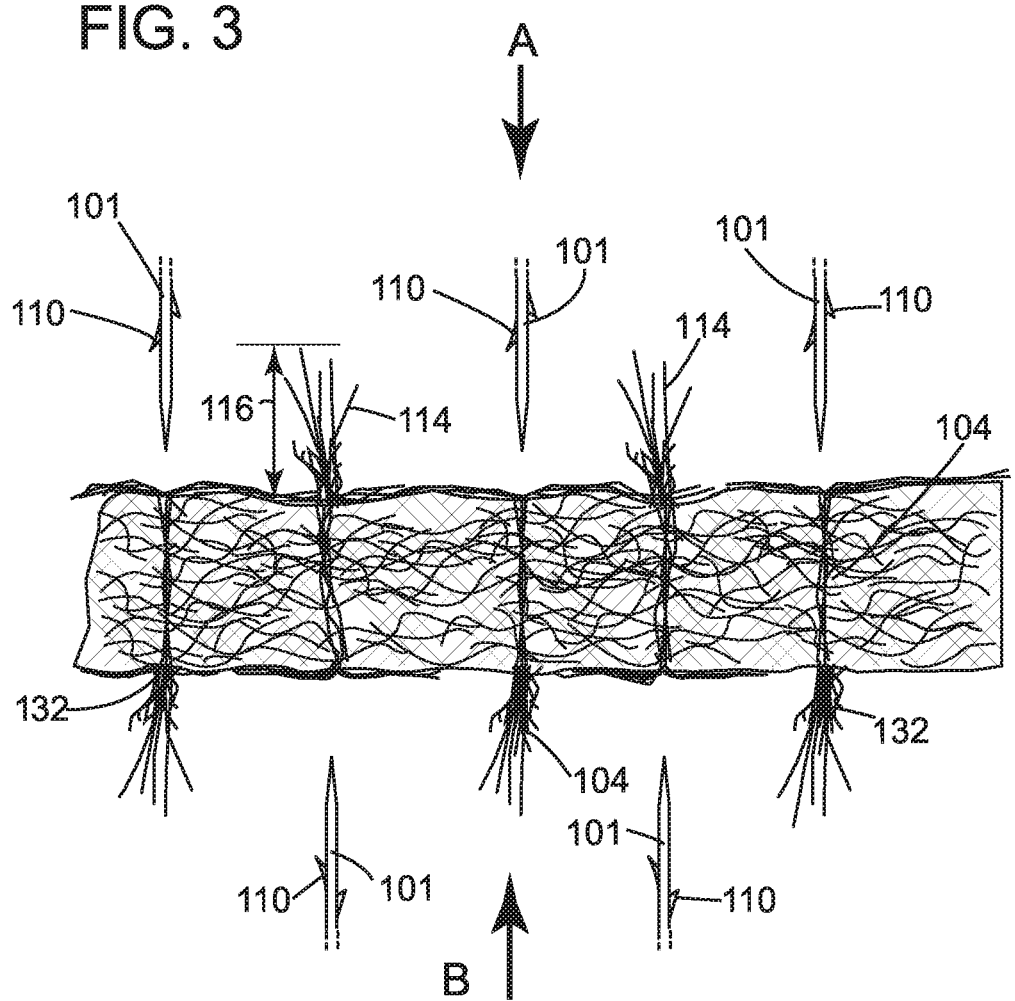
FIG. 3 a schematic representation of the textile sheet structure of FIG. 1 stabilized with coarse needle punching from two faces.

Referring initially to FIGS. 1-3, exemplary embodiments are directed to a textile sheet structure 100 that is initially a sheet of a single fibrous layer having a first face 102 and a second face 103 opposite the first face. This defines a thickness 108 of the fibrous layer. Suitable fibrous layers include, but are not limited to, a commercial needle-punched felt structure sold as carpet underlayment and providing cushion. As illustrated, the single fibrous layer is a single needle-punched layer of mixed fibers 106. These mixed fibers may include short or re-cycled fibers and longer fibers including fibers that have a length that is substantially greater than the thickness of the fibrous layer. The single fibrous layer illustrated in FIG. 1 provides good cushion but tends to bulge at the edges when laterally pushed and to delaminate when the edges are manually separated as described below and illustrated in FIGS. 19 and 22-23.

In one embodiment, the fibrous layer has an initial thickness of approximately 6.6 mm (0.26 inches), and a weight of 34 oz./yd$^3$. The fibrous layer offers good "cushion", compressing by a height of approximately 2.5 mm (0.1 inches) when subjected to a normal pressure of 25 pounds per sq. inch (psi) and recovering back to more than 90% of its original thickness, to approximately 6.4 mm (0.25 inches), amounting to a loss of 4%. When repeatedly re-compressed with 25 psi of normal pressure, the fibrous layer compresses to the same degree and does not appreciably lose thickness. In one embodiment, the fibrous layer contains fibers at either face that melt when contacted with a plate heated to approximately 375° F.

In one embodiment of a stabilized fibrous layer, a plurality of discrete fiber tufts 104 extend from a first face of a fibrous layer of the textile sheet structure, completely through the thickness of the fibrous layer and beyond a second face opposite the first face by a given distance 112. Therefore, each fiber tuft begins at one face and as a result of a needle entrance, passes completely through the fibrous layer and extends past the opposite face. In one embodiment, the given distance is up to about 16 mm (0.625 inches). In another embodiment, the given distance is greater than about 16 mm (0.625 inches). Each discrete fiber tuft contains a plurality of discrete fibers. Each discrete fiber extends along one face, passes through the fibrous layer and extends past the other face. In one embodiment, the plurality of discrete fibers includes staple fibers or continuous-filament fibers.

The individual fiber tufts are created by driving ends or loops of fibers that are sufficiently long to leave some of their length along the needle-penetration surface, i.e., one of the faces, span the thickness 108, and protrude from the needle exit side, i.e., the opposite face, by the given distance 112. Therefore, in addition to extending past the opposite face, each fiber tuft extends along the needle-penetration face away from each point 130 at which a need penetrates that face. These fiber tufts can extend away from the point at which the needle penetrates the face by a length equal to the given distance 112.

In one embodiment, driving fibers is accomplished by needle-punching the fibrous layer with a plurality of coarse needles 101 that are passed through the fibrous layer in the direction of arrow A. Each coarse needle contains a plurality of barbs 110, and each barb engages a plurality of fibers with each needle punch through the fibrous layer. Suitable coarse needles include, but are not limited to, 25-gauge and coarser needles. In one embodiment, the coarse needles are spaced from each other across the face of the fibrous layer by a distance 113 of at least about 5 mm (0.2 inches), preferably at least about 10 mm (0.4 inches). Spacing among the needles can be achieved by attaching the individual needles to a needle board. A predetermined amount of penetrations into the sheet is achieved by controlling the speed of progression under or above the needle-board and the frequency of needle-board reciprocations. In one embodiment, needle punching fibers with coarse needles is conducted at a density of needle penetrations in the fibrous layer of less than a total of about 25 penetrations per $cm^2$, preferably less than about 20 penetrations per $cm^2$.

In one embodiment of a stabilized fibrous layer, the fibrous layer includes a plurality of discrete opposite fiber tufts 114 separate from the discrete fiber tufts 104 and extending from the second face through the fibrous layer and beyond a first face up to a given distance 116. In one embodiment, this given distance is up to about 16 mm (0.625 inches). In another embodiment, this given distance is greater than about 16 mm (0.625 inches). Each discrete opposite fiber tuft contains a plurality of discrete fibers. In one embodiment, the plurality of discrete fibers includes long staple fibers, shorter staple fibers or continuous-filament fibers.

The individual opposite fiber tufts are created by driving the fibers from the second face, through the fibrous layer and past the first face. In one embodiment, driving of the fibers is accomplished by needle-punching the fibrous layer with an additional plurality of coarse needles 101 that are passed through the fibrous layer in the direction of arrow B. In one embodiment, each coarse needle contains a plurality of barbs 110, and each barb engages a plurality of fibers with each needle punch through the fibrous layer. Suitable coarse needles include, but are not limited to, 25-gauge or coarser needles. Suitable spacing for the coarse needles passing in the direction of arrow B are the same as those passing in the direction of arrow A. In one embodiment, needle punching fibers with coarse needles to create both the fiber tufts and opposite fiber tufts is conducted at a density of needle penetrations in the fibrous layer totaling less than about 30 penetrations per $cm^2$, accumulated by the two needle-punching steps.

As with the fiber tufts driven from the first face, the individual opposite fiber tufts are created by driving ends or loops of fibers that are sufficiently long to leave sections of their length along the needle-penetration surface, i.e., the second face, span the thickness 108, and protrude from the needle exit side, i.e., the first face, by the given distance 116. Therefore, in addition to extending past the first face, each fiber tuft extends along the needle-penetration face, i.e., the second face away from each point 132 at which a need penetrates that face. These fiber tufts can extend away from the point at which the needle penetrates the face by a length equal to the given distance 116.

Whether fiber tufts are formed by driving the ends of fibers originating from a single side, i.e., the first face or the second face, or both sides, i.e., the first face and the second face, of the fibrous layer, each individual fiber tuft is attached to both the first and second faces of the fibrous layer. Attachment of each individual fiber tuft to the first and second faces includes joining together the individual fibers in each fiber tuft and bonding the joined fibers to the two faces of the fibrous layer.

Figure 4:
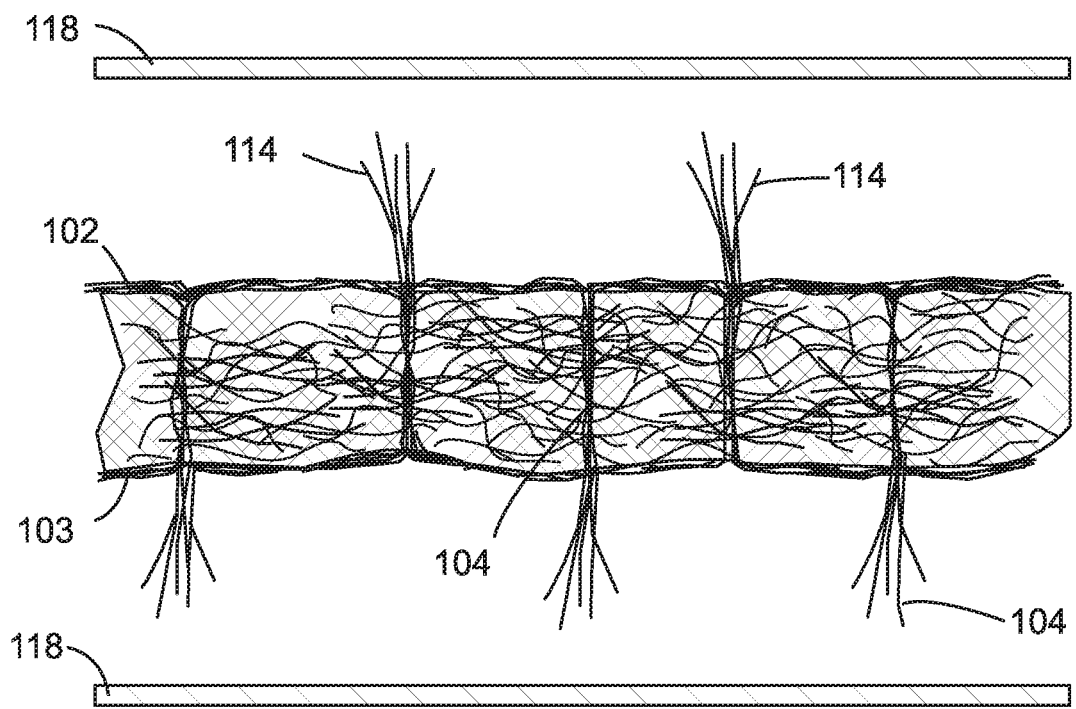
FIG. 4 is a schematic representation of the textile sheet structure of FIG. 3 stabilized with coarse needle punching from two faces with heat and pressure applied to both faces.
Figure 5:
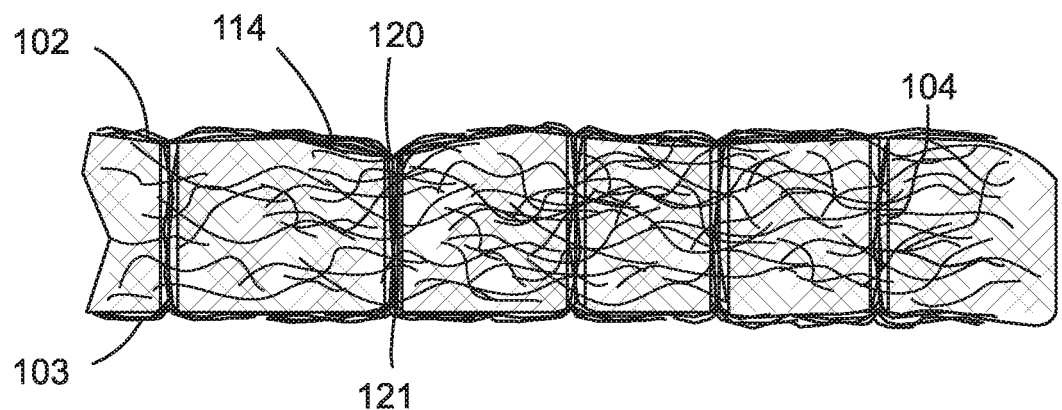
FIG. 5 a schematic representation of the textile sheet structure of FIG. 3 stabilized with coarse needle punching from two faces with the fiber tufts attached to both faces.

Referring to FIGS. 4 and 5, the spacing between each discrete fiber tuft and each discrete opposite fiber tuft is less than given distances 112, 116 that the fiber tufts extends past the faces or that the fiber tufts extends along the faces. Therefore, the individual fibers in each fiber tuft overlap across the faces. Individual fibers in the plurality of discrete fibers in each discrete fiber tuft 104 and each discrete opposite fiber tuft 114 are joined together, and as the individual fiber tufts are spaced from each other at distances less than the given distances associated with the individual fibers in the fiber tufts, the individual fibers and fiber tufts collapse and overlap. Therefore, adjacent tufts and fibers are bonded to each other and to fibers on each surface at both the first face and the second face.

Suitable methods for bonding together the individual fibers include using at least one of heat and pressure. In one embodiment, heat is provided from a stream of hot or heated air or radiation. Alternatively, heated surfaces 118 are moved in the direction of arrows C into contact with the fiber tufts 114, 104 and the first and second faces 102, 103. The joined plurality of discrete fibers in each discrete fiber tuft and each discrete opposite fiber tuft are bonded to the first face and the second face. This anchors each discrete fiber tuft and each discrete opposite fiber tuft to the first face and the second face of the fibrous layer. This creates a first face fiber tuft bond 120 that includes the fibers tufts and opposite fiber tufts, bonding the entire first face, and a second face fiber tuft bond 121 that includes the first tufts and opposite fiber tufts, bonding the entire second face.

Exemplary embodiments of the stabilized textile sheet structure contain groups of fibers extending completely through the thickness of the fibrous layer, or all layers of the textile sheet structure, in multiple locations across the textile sheet structure. Each group of sufficiently long fibers is anchored, fixed or attached at both ends to the faces or outer surfaces of the textile sheet structure. These groups of fibers secure the opposite faces or outer surfaces and prevent delamination of the textile sheet structure as the ends of the fibers do not dislodge from the faces or outer surfaces unless and until the individual fibers themselves stretch or break. This delamination resistance is achieved with sufficient bonding to join the individual fibers in each fiber tuft and to bond the joined fibers at the faces or outer surfaces at the surface of the faces.

As illustrated, the textile sheet structure is needled from one or both faces of the fibrous layer with coarse needles having barbs capable of engaging a large number of fibers at each stroke. The individual coarse needles are spaced apart to minimize engagement of the same fibers by more than one coarse needle. The number of the total accumulated needle insertions is limited to avoid densification. As shown in FIGS. 4 and 5, the two faces are subsequently bonded with heat and minimum pressure, collapsing the protruding tufts and activating any low melt fibers contained within the tufts or within the opposite faces. In one embodiment, solid or liquid adhesive is applied to the two surfaces, and this solid or liquid adhesive is set as the emerging tufts are flattened against the surface of each face. The resulting fibrous layer is stabilized with negligible reduction of bulk and cushion. All embodiments of creating fiber tufts and opposite fiber tufts and bonding the fiber tufts and opposite fiber tufts to the surface of the first and second faces described for the single fibrous layer can be applied to other arrangements of fibrous and non-fibrous layers described below.

Figure 6:
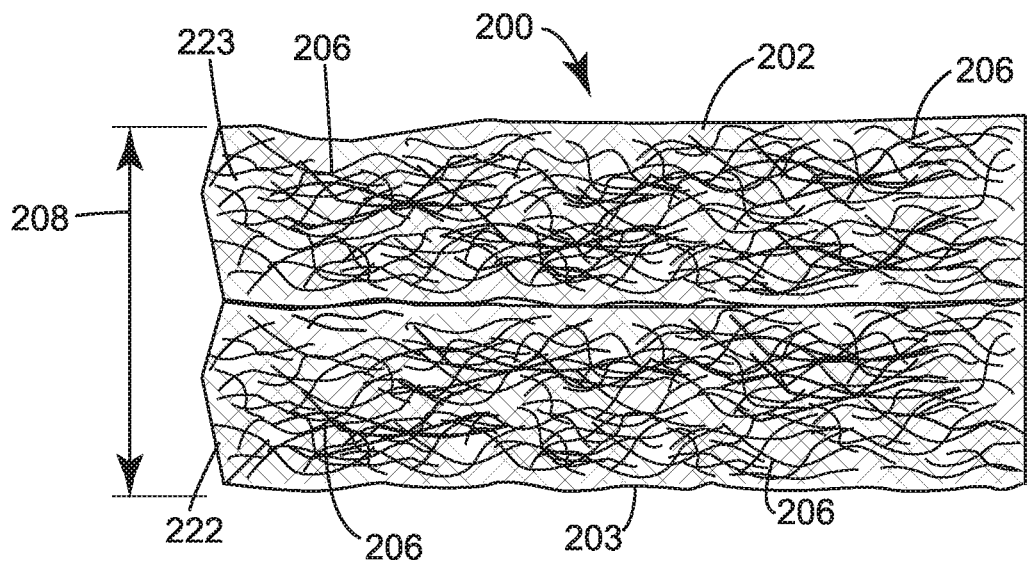
FIG. 6 is a schematic representation of an embodiment of a textile sheet structure containing two fibrous layers.
Figure 7:
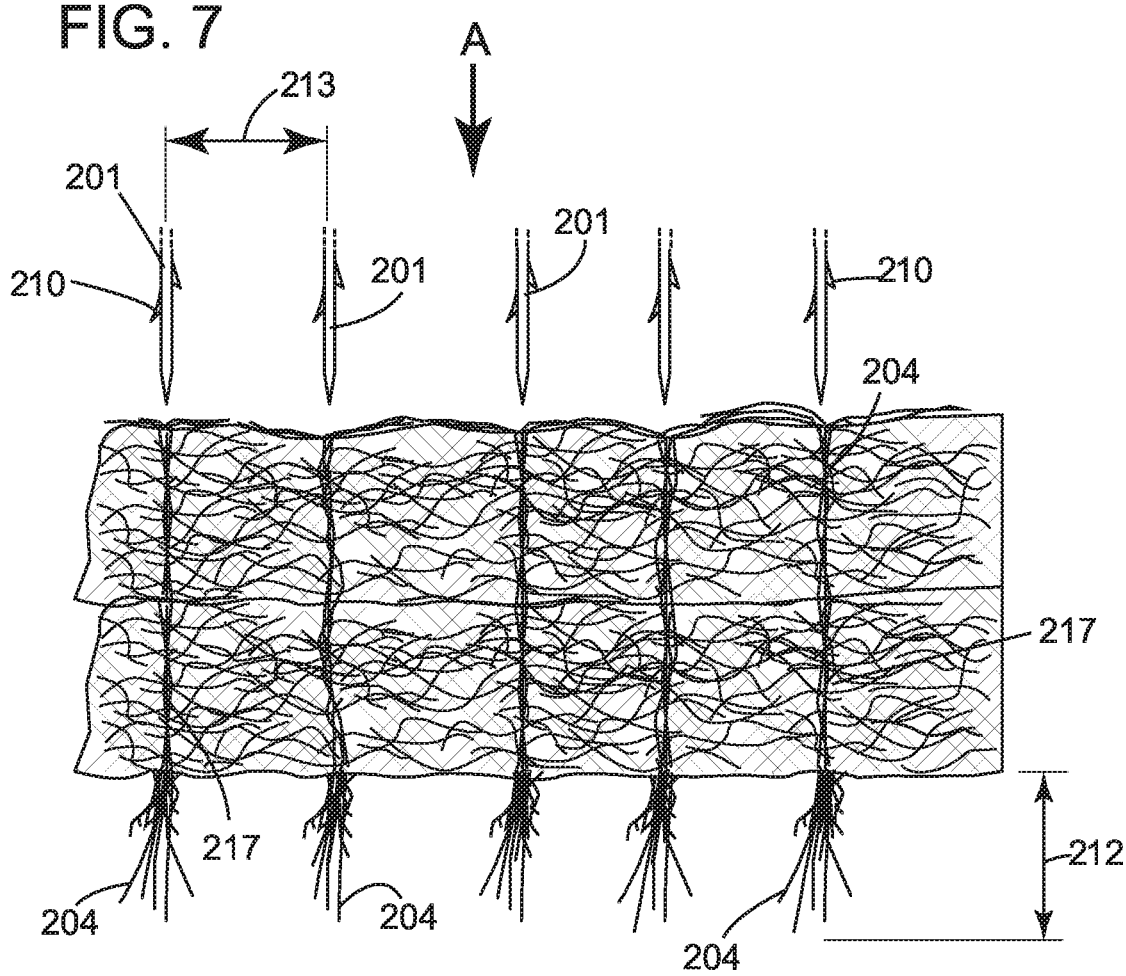
FIG. 7 is a schematic representation of the textile sheet structure of FIG. 6 stabilized with coarse needle punching from a single face.
Figure 8:
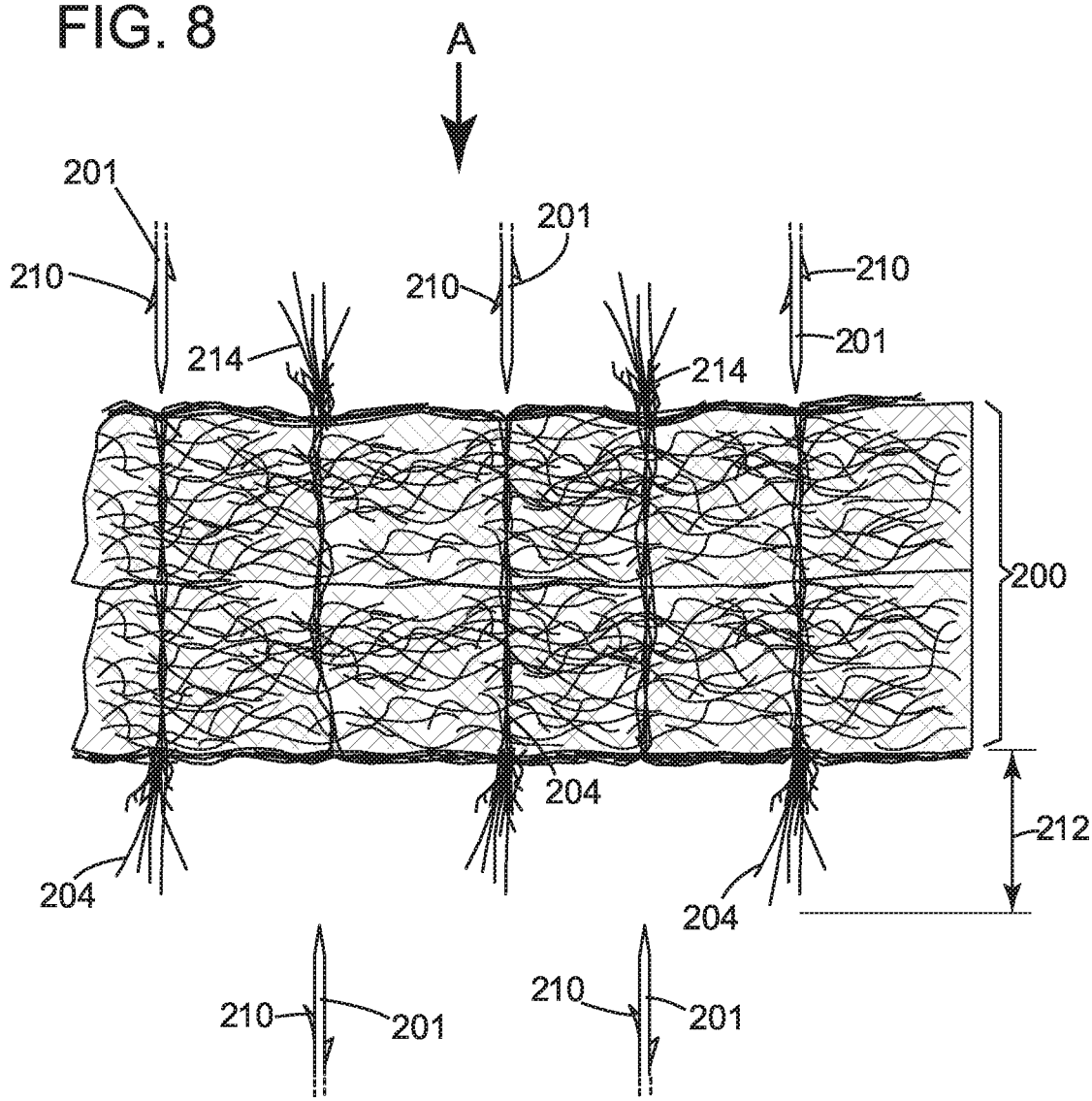
FIG. 8 a schematic representation of the textile sheet structure of FIG. 6 stabilized with coarse needle punching from two faces.

Referring now to FIGS. 6-8, exemplary embodiments are directed to a textile sheet structure 200 that is initially a plurality of fibrous layers arranged in a stack. As illustrated, two fibrous layers are arranged in the stack, a first 223 or top fibrous layer and a second 222 or bottom fibrous layer. The top fibrous layer provides the first face 202, and the bottom fibrous layer includes the second face 203. The combined fibrous layers define an overall thickness 208 of the fibrous layer. Suitable fibrous layers include, but are not limited to, a commercial needle-punched felt structure sold as carpet underlayment and providing cushion. As illustrated, each fibrous layer is a single needle-punched layer of fibers 206. These fibers may include short or re-cycled fibers and longer fibers including fibers 217 that have a length that is sufficiently long to span along both the first and second faces and to pass completely through the thickness. At least a portion of the longer fibers are relatively free, i.e., are not immobilized by being bonded to each other.

In one embodiment of a stabilized fibrous layer, a plurality of discrete fiber tufts 204 extend along the first face of the top fibrous layer of the textile sheet structure, through the plurality of fibrous layers and beyond the second face in the bottom fibrous layer by a given distance 212. In one embodiment, the given distance is up to about 16 mm (0.625 inches). In another embodiment, the given distance is greater than about 16 mm (0.625 inches). Each discrete fiber tuft contains a plurality of discrete fibers. In one embodiment, the plurality of discrete fibers includes staple fibers or continuous-filament fibers.

The individual fiber tufts are created by driving the longer fibers from the first face, through the fibrous layer and past the second face. In one embodiment, driving of the fibers is accomplished by needle-punching the fibrous layers with a plurality of coarse needles 201 that are passed through the fibrous layers in the direction of arrow A. Each coarse needle contains a plurality of barbs 210, and each barb engages a plurality of fibers with each needle punch through the fibrous layers. Suitable coarse needles include, but are not limited to, 25-gauge or coarser needles. In one embodiment, the coarse needles are spaced from each across the face of the fibrous layers by a distance 213 of at least about 5 mm (0.2 inches), preferably at least about 10 mm (0.4 inches). Spacing among the needles can be achieved by attaching the individual needles to a needle board. In one embodiment, needle punching fibers with coarse needles is conducted at a density of needle penetrations in the fibrous layers of less than about 25 penetrations per $cm^2$, preferably less than about 20 penetrations per $cm^2$.

In one embodiment of stabilized fibrous layers, the fibrous layers include a plurality of discrete opposite fiber tufts 214 separate from the discrete fiber tufts 104 and extending along the second face through the fibrous layers and beyond a first face up to a given distance 216. In one embodiment, this given distance is up to about 16 mm (0.625 inches). In another embodiment, this given distance is greater than about 16 mm (0.625 inches). Each discrete opposite fiber tuft includes a plurality discrete fibers. In one embodiment, the plurality of discrete fibers includes long staple fibers or continuous-filament fibers.

The individual opposite fiber tufts are created by driving fibers from the second face, through the fibrous layers and past the first face. In one embodiment, driving of the fibers is accomplished by needle-punching the fibrous layer with an additional plurality of coarse needles 201 that are passed through the fibrous layer in the direction of arrow B. These can be the same type of coarse needles used to create the discrete fiber tufts 204 or different types of coarse needles. In one embodiment, each coarse needle contains a plurality of barbs 210, and each barb engages a plurality of fibers with each needle punch through the fibrous layers. Suitable coarse needles include, but are not limited to, 25-gauge triangular needles and coarser needles. Suitable spacing for the coarse needles passing in the direction of arrow B are the same as those passing in the direction of arrow A. In one embodiment, needle punching fibers with coarse needles is conducted at a density of needle penetrations in the fibrous layers of less than a total of about 30 penetrations per $cm^2$ for needle punching from both the first and second face.

Whether fiber tufts are formed from a single side or from both sides of the fibrous layers, each individual fiber tuft is attached to both the faces of the fibrous layers. This includes joining together the individual fibers and bonding the joined fibers to each other and to the faces of the fibrous layers. Suitable attachments of the discrete fiber tufts and discrete opposite fiber tufts and methods for making these attachments are the same as for the textile sheet structure containing the single fibrous layer.

Figure 9:
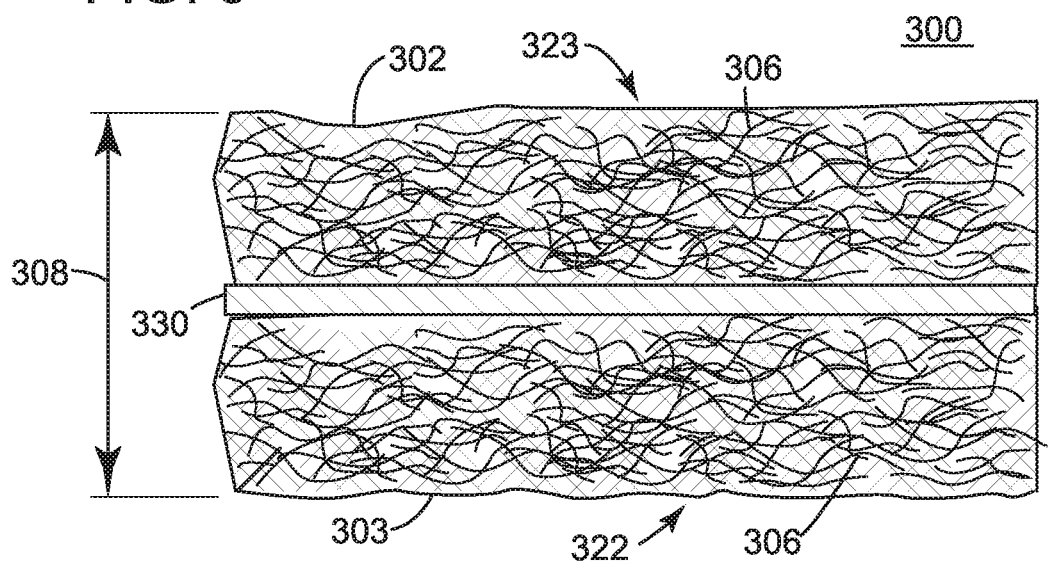
FIG. 9 is a schematic representation of an embodiment of a textile sheet structure containing two fibrous layers and an intermediate film layer.
Figure 10:
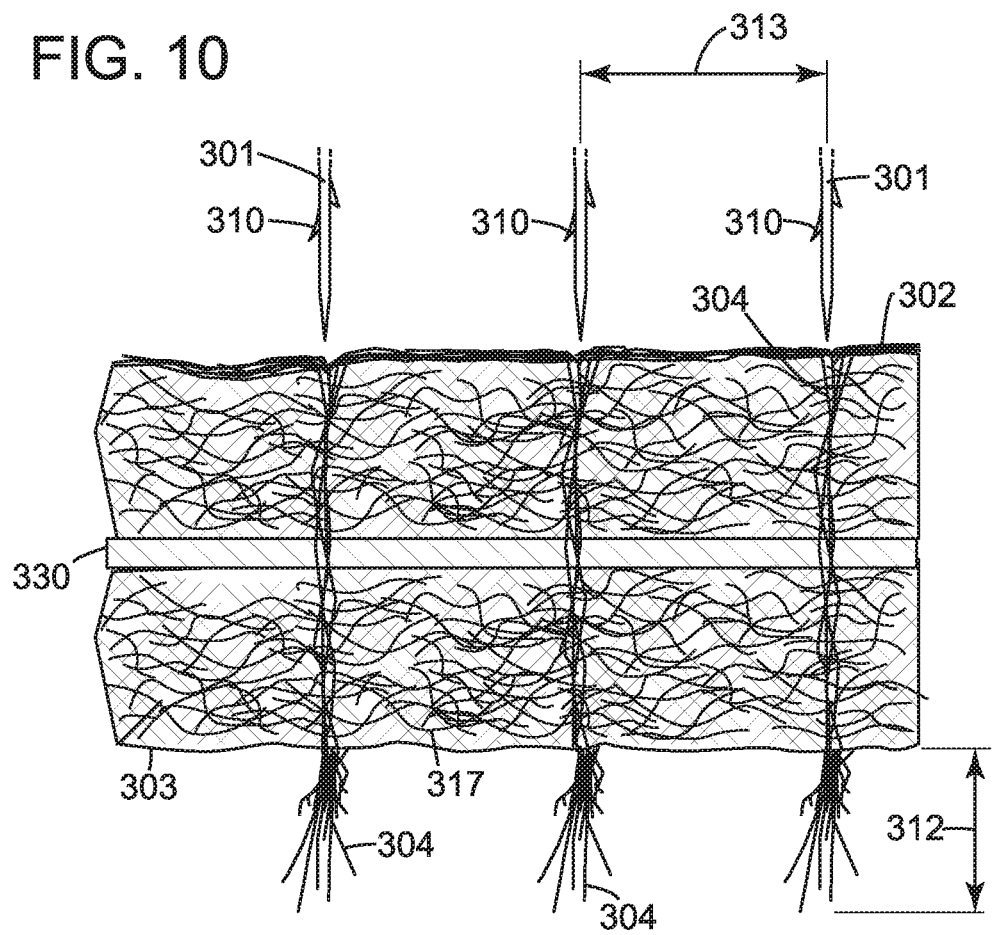
FIG. 10 is a schematic representation of the textile sheet structure of FIG. 9 stabilized with coarse needle punching from a single face.
Figure 11:
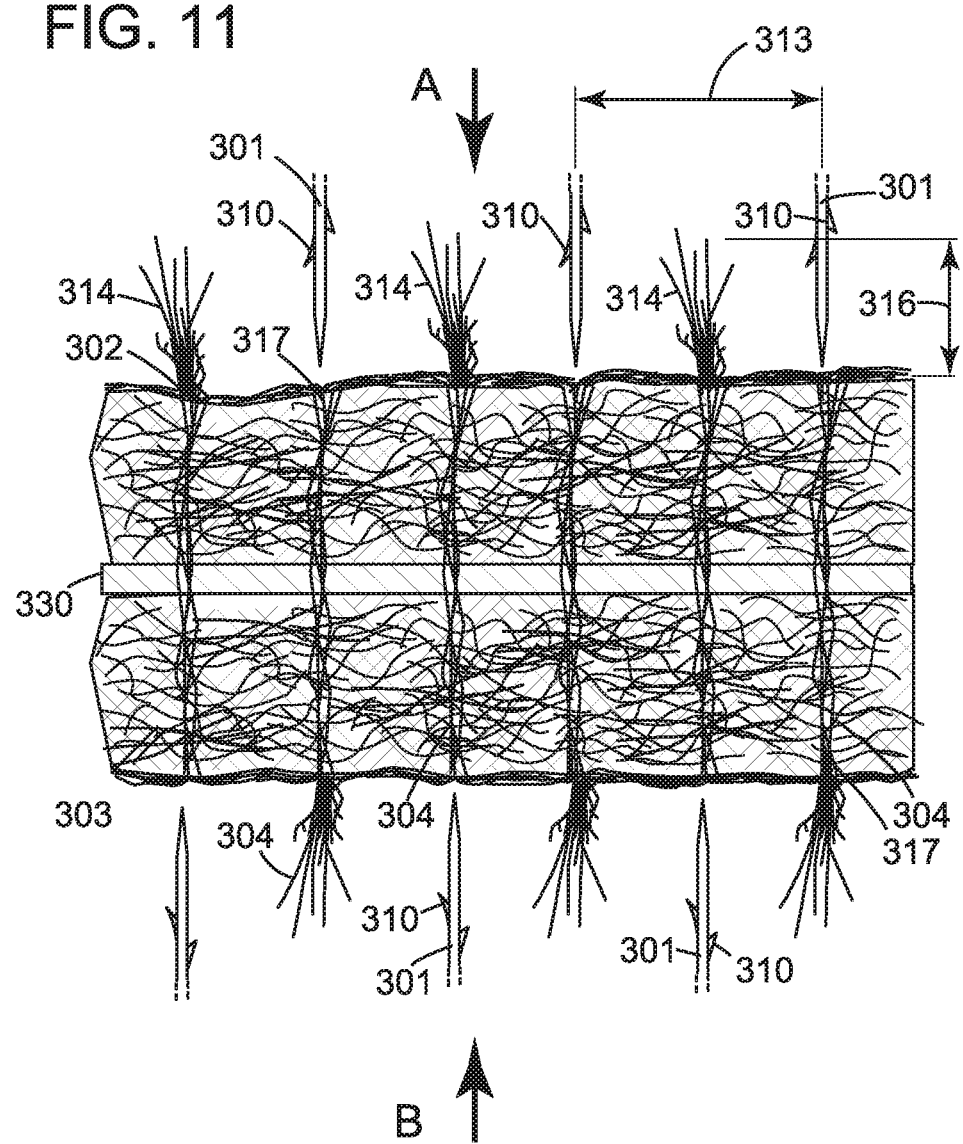
FIG. 11 a schematic representation of the textile sheet structure of FIG. 9 stabilized with coarse needle punching from two faces.

Referring now to FIGS. 9-11, exemplary embodiments are directed to a textile sheet structure 300 that initially contains one intermediate layer 330 placed between any two adjacent fibrous layers. As illustrated, the textile sheet structure includes two fibrous layers, a first 323 or top fibrous layer and a second 322 or bottom fibrous layer and a single intermediate layer. Suitable intermediate layers include, but are not limited to, a film, paper, scrim, nonwoven fabric, antifungal sheets, antimicrobial sheets and combinations thereof. The top fibrous layer contains the first face 302, and the bottom fibrous layer includes the second face 303. The combined fibrous layers and intermediate layer define an initial overall thickness 308 of the textile sheet structure. As illustrated, each fibrous layer is a single needle-punched layer of fibers 306. These fibers may include short or re-cycled fibers and longer fibers 317 that have a length that is greater than the initial overall thickness of the fibrous layers and intermediate sheet of the textile sheet structure by an amount sufficient to facilitate these fibers spanning along the first and second faces or extending out from the first and second faces. At least a portion of the longer fibers are relatively free, i.e., are not immobilized by being bonded to each other.

In one embodiment of a stabilized fibrous layer, a plurality of discrete fiber tufts 304 extend along the first face of the top fibrous layer of the textile sheet structure, through the top fibrous layer, the at least one intermediate layer and the bottom fibrous layer and beyond the second face in the bottom fibrous layer by a given distance 312. In one embodiment, the given distance is up to about 16 mm (0.625 inches). In another embodiment, the distance is greater than about 16 mm (0.625 inches). Each discrete fiber tuft contains a plurality of discrete fibers. In one embodiment, the plurality of discrete fibers includes long staple fibers or continuous-filament fibers.

The individual fiber tufts are created by driving fibers from the first face, through the fibrous layer and intermediate layer and past the second face. In one embodiment, driving of the fibers is accomplished by needle-punching the fibrous layers with a plurality of coarse needles 301 that are passed through the fibrous layers in the direction of arrow A. Each coarse needle contains a plurality of barbs 310, and each barb engages a plurality of fibers with each needle punch through the fibrous layers. Suitable coarse needles include, but are not limited to, 25-gauge needles and coarser needles. In one embodiment, the coarse needles are spaced from each across the face of the fibrous layers by a distance 313 of at least about 5 mm (0.2 inches), preferably at least about 10 mm (0.4 inches). Spacing among the needles can be achieved by attaching the individual needles to a needle board. In one embodiment, needle punching fibers with coarse needles is conducted at a density of needle penetrations in the fibrous layers of less than about 25 penetrations per $cm^2$, preferably less than about 20 penetrations per $cm^2$.

In one embodiment of stabilized fibrous layers, the fibrous layers include a plurality of discrete opposite fiber tufts 314 separate from the discrete fiber tufts 304 and extending along the second face of the bottom fibrous layer of the textile sheet structure, through the bottom fibrous layer, the intermediate layer and the top fibrous layer and beyond the first face in the top fibrous layer up to a given distance 316. In one embodiment, this given distance is up to about 16 mm (0.625 inches). In another embodiment, the given distance is greater than about 16 mm (0.625 inches). Each discrete opposite fiber tuft includes a plurality discrete fibers. In one embodiment, the plurality of discrete fibers includes long staple fibers or continuous-filament fibers.

The individual opposite fiber tufts are created by driving the longer fibers from the second face, through the fibrous layers and intermediate layer and past the first face. In one embodiment, driving of the longer fibers is accomplished by needle-punching the fibrous layer with an additional plurality of coarse needles 301 that are passed through the fibrous layer in the direction of arrow B. These can be the same type of coarse needles used to create the discrete fiber tufts 304 or different types of coarse needles. In one embodiment, each coarse needle contains a plurality of barbs 310, and each barb engages a plurality of fibers with each needle punch through the fibrous layers. Suitable coarse needles include, but are not limited to, a 25-gauge needle and coarser needles. Suitable spacing for the coarse needles passing in the direction of arrow B are the same as those passing in the direction of arrow A. In one embodiment, needle punching fibers with coarse needles is conducted at a density of needle penetrations in the fibrous layers of less than a total of about 30 penetrations per cm$^2$ for textile sheet products containing both discrete fiber tufts and discrete opposite fiber tufts.

Whether fiber tufts are formed from a single side or both sides of the fibrous layers, these individual fiber tufts are attached to both the faces of the fibrous layers. This includes joining together the individual fibers and bonding the joined fibers to the face of the fibrous layers. Suitable attachment of the discrete fiber tufts and discrete opposite fiber tufts and methods for making these attachments are the same as for the textile sheet structure containing the single fibrous layer.

Figure 12:
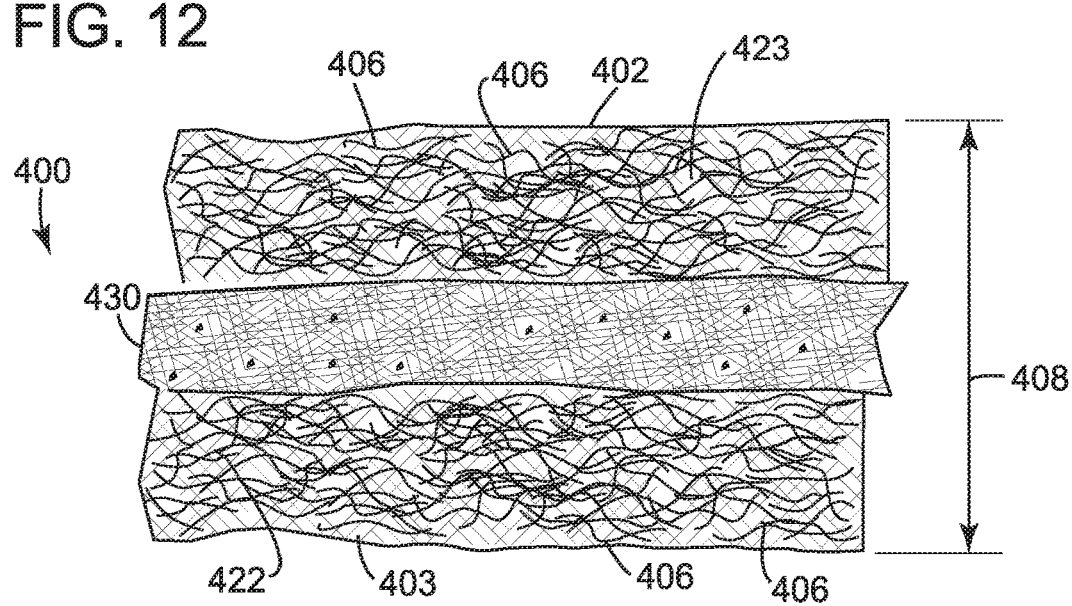
FIG. 12 is a schematic representation of an embodiment of a textile sheet structure containing two fibrous layers and an intermediate recycled, short fiber layer.
Figure 13:
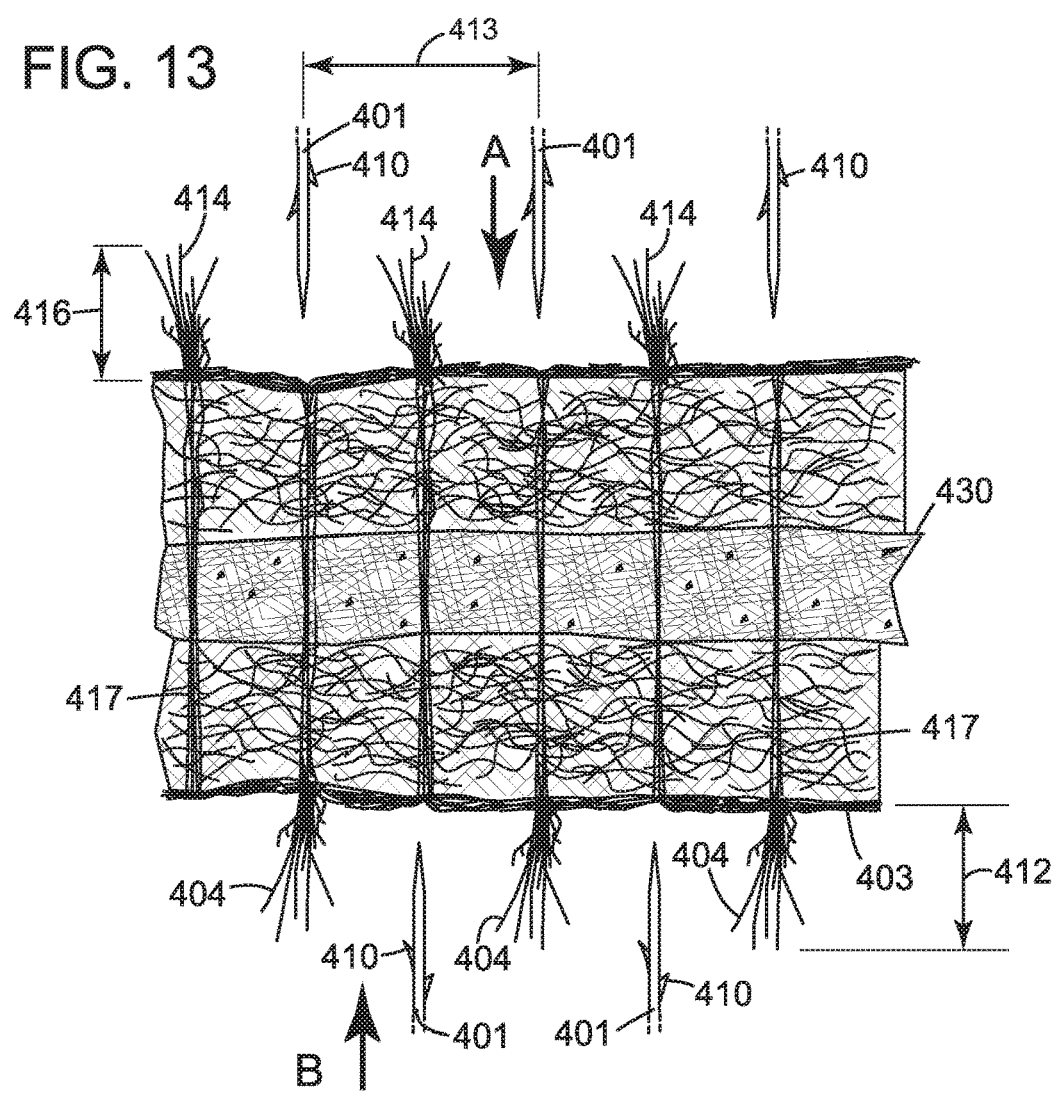
FIG. 13 a schematic representation of the textile sheet structure of FIG. 12 stabilized with coarse needle punching from two faces.

Referring now to FIGS. 12-13, exemplary embodiments are directed to a textile sheet structure 400 that is initially a stack of one mid-layer 430 placed between two fibrous layers. The mid-layer is a non-coherent fibrous layer containing chopped or recycled floorcovering fibers, i.e., short fibers. As illustrated, the textile sheet structure includes two outer fibrous layers, a first 423 or top fibrous layer and a second 422 or bottom fibrous layer. The top fibrous layer contains the first face 402, and the bottom fibrous layer includes the second face 403. The combined fibrous layers and mid-layer define an overall thickness 408 of the textile sheet structure. As illustrated, each fibrous layer 422, 423 is a single needle-punched layer of fibers 406. These fibers include longer fibers including fibers 417 At least a portion of the longer fibers are relatively free, i.e., are not immobilized by being bonded to each other.

In one embodiment of a stabilized fibrous layer, a plurality of discrete fiber tufts 404 extend along the first face of the top fibrous layer of the textile sheet structure, through the top fibrous layer, the mid-layer and the bottom fibrous layer, and beyond the second face in the bottom fibrous layer by a given distance 412. In one embodiment, the given distance is up to about 16 mm (0.625 inches). In another embodiment, the given distance is greater than about 16 mm (0.625 inches). Each discrete fiber tuft contains a plurality discrete fibers. In one embodiment, the plurality of discrete fibers includes staple fibers or continuous-filament fibers.

The individual fiber tufts are created by driving the longer fibers from the first face, through the fibrous layer and intermediate layer and past the second face. In one embodiment, driving of the fibers is accomplished by needle-punching the fibrous layers with a plurality of coarse needles 401 that are passed through the fibrous layers in the direction of arrow A. Each coarse needle contains a plurality of barbs 410, and each barb engages a plurality of fibers with each needle punch through the fibrous layers. Suitable coarse needles include, but are not limited to, 25-gauge needles and coarser needles. In one embodiment, the coarse needles are spaced from each other across the face of the fibrous layers by a distance 413 of at least about 5 mm (0.2 inches), preferably at least about 10 mm (0.4 inches). Spacing among the needles can be achieved by attaching the individual needles to a needle board. In one embodiment, needle punching fibers with coarse needles is conducted at a density of needle penetrations in the fibrous layers of less than about 25 penetrations per cm$^2$, preferably less than about 20 penetrations per cm$^2$.

In one embodiment of stabilized fibrous layers, the fibrous layers include a plurality of discrete opposite fiber tufts 414 separate from the discrete fiber tufts 404 and extending along the second face of the bottom fibrous layer of the textile sheet structure, through the bottom fibrous layer, the at least one mid-layer and the top fibrous layer and beyond the first face in the top fibrous layer up to a given distance 416. In one embodiment, this distance is greater than about 16 mm (0.625 inches). Each discrete opposite fiber tuft includes a plurality discrete fibers. In one embodiment, the plurality of discrete fibers includes staple fibers or continuous-filament fibers.

The individual opposite fiber tufts are created by driving the longer fibers from the second face, through the fibrous layers and mid-layer and past the first face. In one embodiment, driving of the fibers is accomplished by needle-punching the fibrous layer with an additional plurality of coarse needles 401 that are passed through the fibrous layer in the direction of arrow B. These can be the same type of coarse needles used to create the discrete fiber tufts 404 or different types of coarse needles. In one embodiment, each coarse needle contains a plurality of barbs 410, and each barb engages a plurality of fibers with each needle punch through the fibrous layers. Suitable coarse needles include, but are not limited to, 25-gauge needles and coarser needles. Suitable spacing for the coarse needles passing in the direction of arrow B are the same as those passing in the direction of arrow A. In one embodiment, needle punching fibers with coarse needles is conducted at a density of needle penetrations in the fibrous layers of less than about 30 penetrations per cm$^2$ when needle punching from both faces.

Whether fiber tufts are formed from a single side or both sides of the fibrous layers, these individual fiber tufts are attached to both the faces of the fibrous layers. This includes joining together the individual fibers and bonding the joined fibers to the face of the fibrous layers. Suitable attachment of the discrete fiber tufts and discrete opposite fiber tufts and methods for making these attachments are the same as for the textile sheet structure containing the single fibrous layer.

Figure 14:
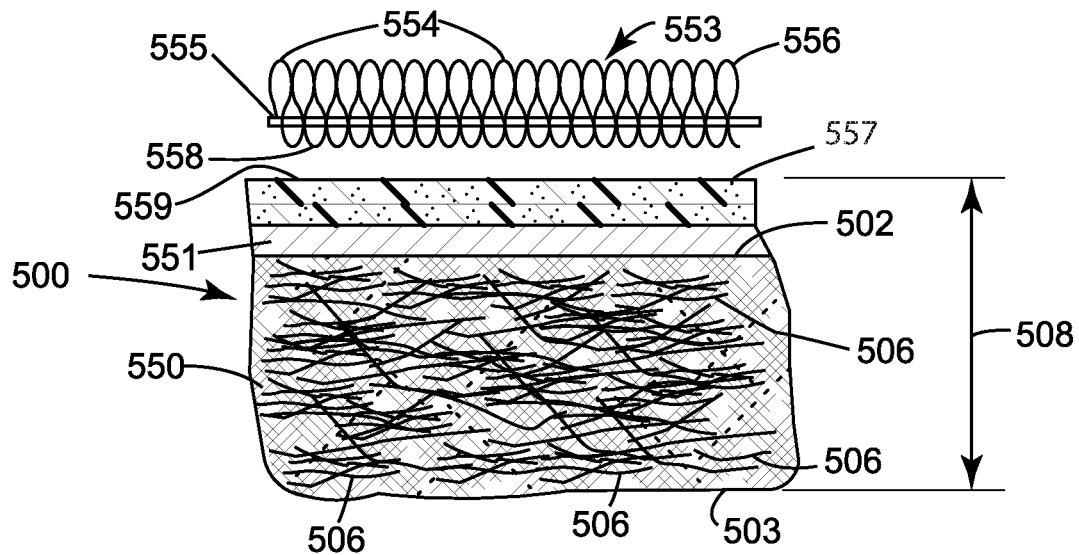
FIG. 14 is a schematic representation of an embodiment of a textile sheet structure containing a multi-layer cushioning backing containing a fibrous layer and a preformed textile face fabric.
Figure 15:
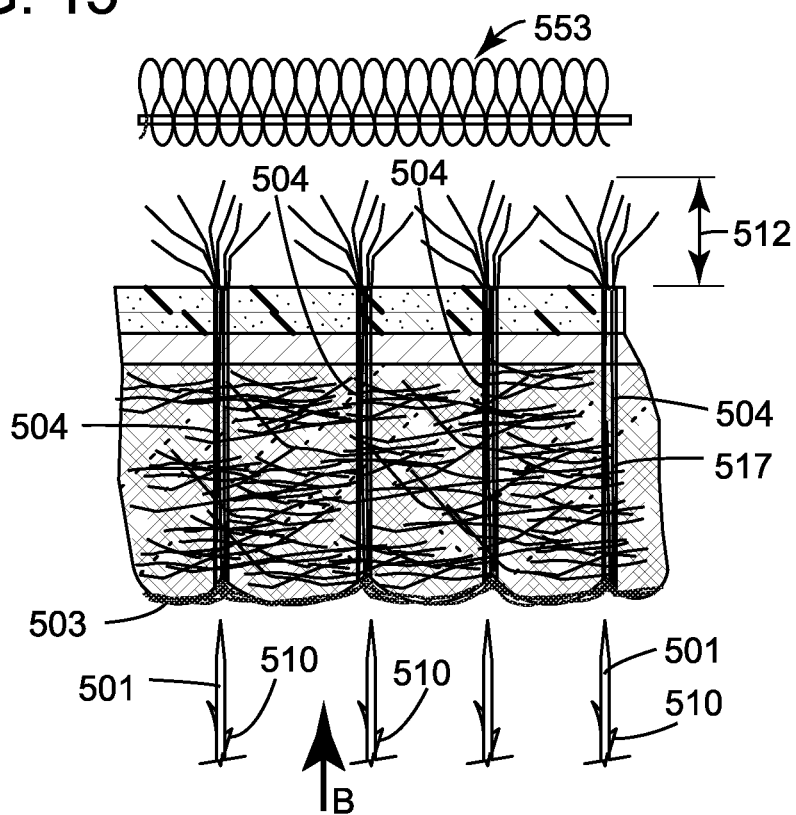
FIG. 15 is a schematic representation of the textile sheet structure of FIG. 14 with the multi-layer cushioning backing stabilized with coarse needle punching from a single face.
Figure 16:
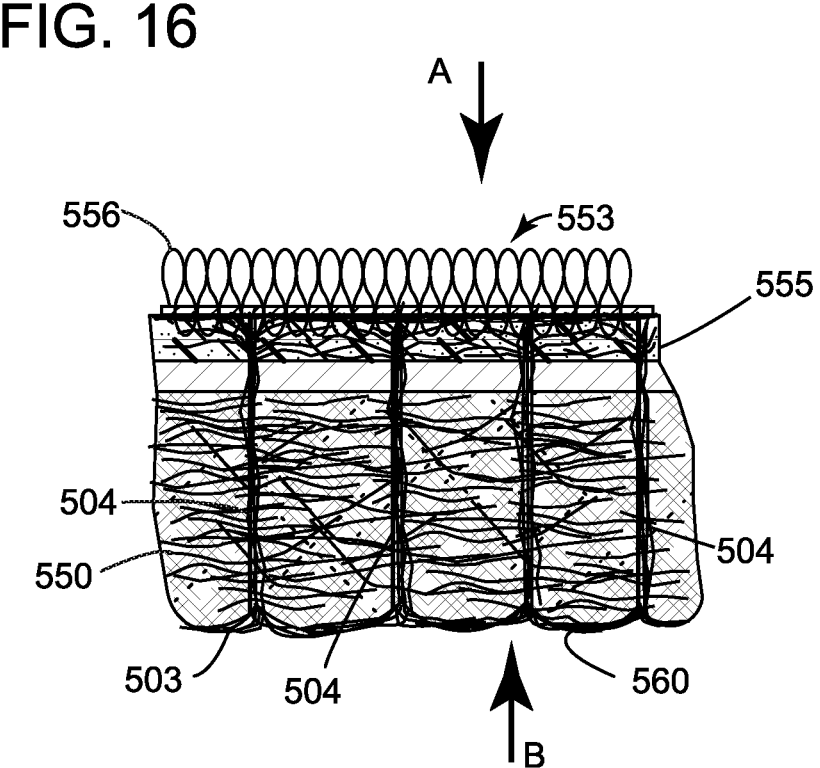
FIG. 16 a schematic representation of the textile sheet structure of FIG. 12 with the stabilized multi-layer cushioning backing attached to the textile face fabric.

Referring now to FIGS. 14-16, exemplary embodiments are directed to a textile sheet structure 500 initially containing a plurality of layers arranged as a stack including a fibrous layer 550 having a first face 502 and a second face 503 opposite the first face. A stabilizing layer 551 is placed against the first face, and a dual adhesive layer 557 is placed against the stabilizing layer such that the stabilizing layer is located between the dual adhesive layer and the fibrous layer. The dual adhesive layer includes an outer face 559 located opposite the stabilizing layer 551. In one embodiment, the stabilizing layer is a fiberglass nonwoven layer weighing 7 oz./sq., and the dual adhesive layer is two layers of low density polyethylene film.

The combined fibrous layers, stabilizing layer and dual adhesive layer define an overall thickness 508 from the second face to the outer face. Suitable fibrous layers include, but are not limited to, commercial needle-punched felt structures sold as carpet underlayment and providing cushion. As illustrated, the fibrous layer is a needle-punched layer of mixed fibers 506. These mixed fibers include short or re-cycled fibers and longer fibers including longer fibers 517. At least a portion of the longer fibers are relatively free, i.e., are not immobilized by being bonded to each other.

The textile sheet structure also includes a pre-formed textile face fabric 553. In one embodiment, the textile face fabric is a tufted fabric including a plurality of yarns 554 tufted into a primary backing 555. This defines a fabric or pile face 556 on one side and underlaps 558 on an opposite side of the face layer. The textile face fabric can be joined to the combined fibrous layers, stabilizing layer and dual adhesive layer using heat and light pressure from the pile face without inducing a significant loss of thickness or cushion in the textile sheet structure.

The fibrous layer provides backing and cushioning to the textile sheet structure, and in one embodiment of a stabilized fibrous layer, a plurality of discrete fiber tufts 504 extend along the second face of the fibrous layer of the textile sheet structure, through the fibrous layer, stabilizing layer and dual adhesive layer and beyond the outer face of the dual adhesive layer by a given distance 512. In one embodiment, the given distance is up to about 16 mm (0.625 inches). In another embodiment, the given distance is greater than about 16 mm (0.625 inches). Each discrete fiber tuft contains a plurality of discrete fibers. In one embodiment, the plurality of discrete fibers includes staple fibers or continuous-filament fibers.

The individual fiber tufts are created by driving the fibers from the second face 503, through the fibrous layer, stabilizing layer and dual adhesive layer and past the outer face. In one embodiment, driving of the fibers is accomplished by needle-punching the fibrous layer 550 with a plurality of coarse needles 501 that are passed through the fibrous layer as well as the stabilizing layer 551 and the adhesive layer 559, in the direction of arrow B. Each coarse needle contains a plurality of barbs 510, and each barb engages a plurality of fibers with each needle punch through the fibrous layer. Suitable coarse needles include, but are not limited to, 25-gauge needles and coarser needles. In one embodiment, the coarse needles are spaced from each across the face of the fibrous layers by a distance 512 of at least about 5 mm (0.2 inches), preferably at least about 10 mm (0.4 inches). Spacing among the needles can be achieved by attaching the individual needles to a needle board. In one embodiment, needle punching fibers with coarse needles is conducted at a density of needle penetrations in the fibrous layer of less than about 25 penetrations per $cm^2$, preferably less than about 20 penetrations per $cm^2$.

As shown in FIG. 15, the pre-formed textile face fabric 553 is placed over the needle-punched assembly over the fiber tufts. As shown in FIG. 16, heat and pressure are applied from the pile face 556 in the direction of arrow A to combine all layers while the fiber tufts 504 collapse and the whole structure is securely bonded. This includes joining together the individual fibers and bonding the joined fibers to the faces of the of the adjacent layers. Joining the fiber tufts and attaching the joined fiber tufts to the outer face 557, joining and attaching of the fiber tufts to the second face of the fibrous layer 550 to create a bonded surface 560 and attaching the joined fiber tufts to the underlaps of the pre-formed textile face fabric 553 are accomplished simultaneously with the attachment of the pre-formed textile face fabric to the outer face of the dual adhesive layer. Pressure and heat are applied to outer face 557, joining the fibers and bonding the joined fibers to the fibrous layer and dual adhesive layer. As also shown in FIG. 16, light pressure and heat are also applied to the second face 503 in the direction of arrow B before, during or after lamination of the pre-formed textile face fabric 553 to tie the tail ends of the tufts 504 to the second surface 503 to create the bonded surface 560 without causing undue loss of cushion or thickness.

In another embodiment, the pre-formed textile face fabric 553 shown in FIGS. 14, 15 and 16 is a knit fabric, woven fabric, nonwoven fabric, stitchbonded fabric or any other fibrous fabric. In one embodiment, the stabilizing layer 551 is not included. In one embodiment, heat and pressure are applied from the top using a three-dimensional surface so that the upper pile face 556 of the resulting textile sheet structure is highly-textured. In still another embodiment the second face 503 can be separately bonded with added adhesive or low pressure and heat to further secure the fiber tufts, forming shallow bonds within the bonded surface on the second face 503 without unduly reducing bulk and cushion.

Figure 17:
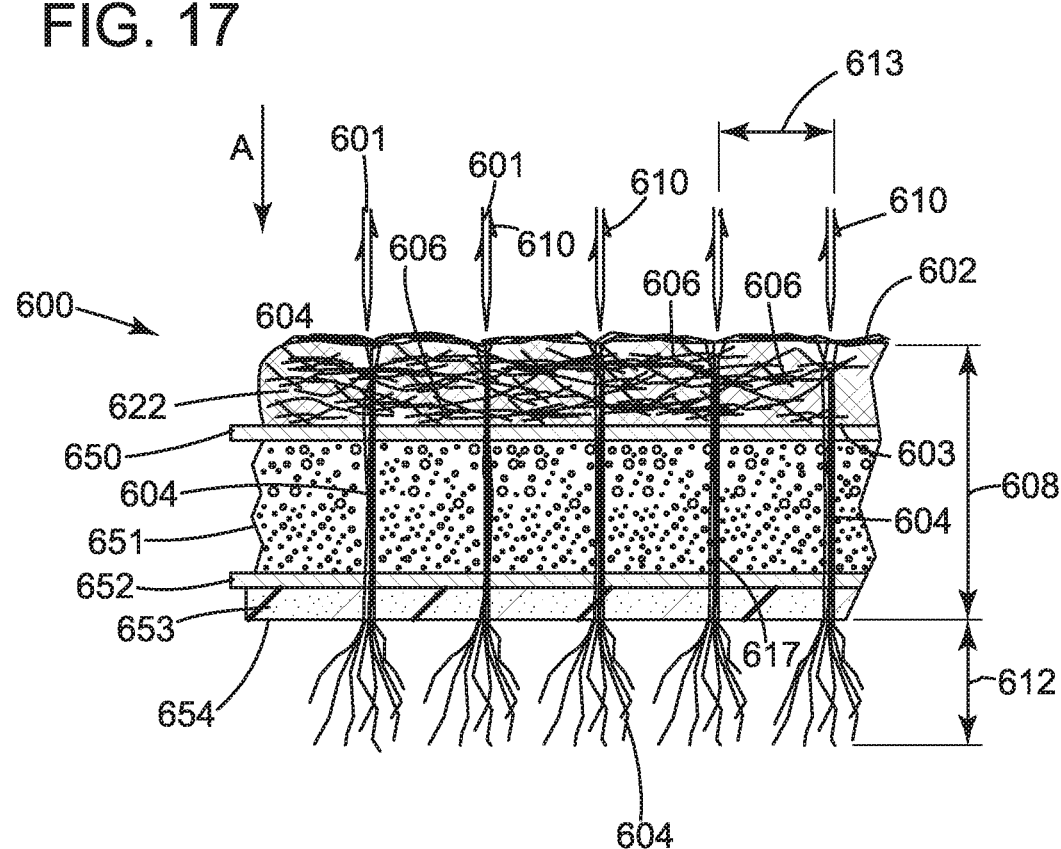
FIG. 17 is a schematic representation of an embodiment of a textile sheet structure containing multiple layers joined by long fibers needle punched from a top fibrous layer.
Figure 18:
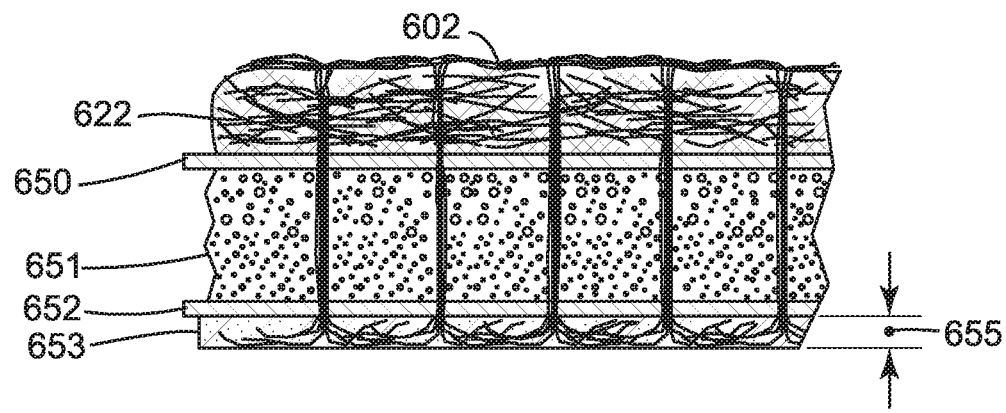
FIG. 18 is a schematic representation of the textile sheet structure of FIG. 17 with the needle-punched fiber tufts bonded to the faces of the textile sheet structure.

Referring now to FIGS. 17-18, exemplary embodiments are directed to a textile sheet structure 600 containing a plurality of layers arranged as a stack including a fibrous layer 622 having a first face 602 and a second face 603 opposite the first face. The second face of the fibrous layer is in contact with a polyester film 650 intended as a stress-distributing shock absorber and planar stiffener. A polyurethane foam cushioning layer 651 is placed under the polyester film, and a second polyester film layer 652 under the foam cushioning layer to protect the foam layer from heat. Therefore, the foam layer is sandwiched between two polyester film layers, which can be identical polyester film layers or different polyester film layers. In one embodiment, the top polyester film layer is a relatively thin film, and the lower polyester film is a relatively thick and heavy gauge film. Under the lower polyester film 652, a low-melting polyethylene adhesive film 653 is placed. The low-melting polyethylene adhesive film defines a bottom surface 654 of the assembly of FIG. 17.

The combined layers from the first face of the fibrous layer to the bottom surface of the low-melting polyethylene film define an overall thickness 608. Suitable fibrous layers include, but are not limited to, a commercial needle-punched felt structure sold as carpet underlayment and providing extra cushion. As illustrated, the fibrous layer is a needle-punched layer of mixed fibers 606. These fibers include short or re-cycled fibers and longer fibers including fibers 617 that have a length that is greater than the overall thickness 608. At least a portion of the longer fibers are relatively free, i.e., are not immobilized by being bonded to each other.

In one embodiment of a stabilized fibrous layer, a plurality of discrete fiber tufts 604 extend along the first face of the fibrous layer of the textile sheet structure, through all the layers and beyond the bottom surface of the outer face of the low-melting polyethylene adhesive film by a given distance 612. In one embodiment, the given distance is up to about 16 mm (0.625 inches). In another embodiment, the given distance is greater than about 16 mm (0.625 inches). Each discrete fiber tuft contains a plurality of discrete fibers. In one embodiment, the plurality of discrete fibers includes staple fibers or continuous-filament fibers.

The individual fiber tufts are created by driving the longer fibers from the first face, through the fibrous layer and additional layers and past the bottom surface 654. Driving of the fibers is accomplished by needle-punching the fibrous layers with a plurality of coarse needles 601 that are passed through the fibrous layers in the direction of arrow A. Each coarse needle contains a plurality of barbs 610, and each barb engages a plurality of fibers with each needle punch through the fibrous layer. Suitable coarse needles include, but are not limited to, 25-gauge needles and coarser needles. In one embodiment, the coarse needles are spaced from each across the face of the fibrous layers by a distance 612 of at least about 5 mm (0.2 inches), preferably at least about 10 mm (0.4 inches). Spacing among the needles can be achieved by attaching the individual needles to a needle board. In one embodiment, needle punching fibers with coarse needles is conducted at a density of needle penetrations in the fibrous layer of less than about 25 penetrations per $cm^2$, preferably less than about 20 penetrations per $cm^2$.

The individual fiber tufts are attached to the bottom surface of the low-melting polyethylene film and to the first face of the fibrous layer. This includes flattening the protruding sections of the fiber tufts and bonding the adjacent flattened fiber tufts to each other and to the first face of the fibrous layer and to the bottom surface. Attaching the tail ends of the fiber tufts running along the first face to the first face and the flattened protruding sections to the bottom surface can be accomplished simultaneously or sequentially by applying heat and pressure to the first face and the bottom surface. The applied heat and pressure also compresses the low-melting polyethylene adhesive film resulting in a reduced thickness 655 in the low-melting polyethylene adhesive film. The protruding sections of the fiber tufts are bonded to and at least partially imbedded in the low-melting polyethylene film.

The low-melting polyethylene adhesive film 653 in FIGS. 17 and 18 can be substituted with a low-melting scrim, a thin low melt nonwoven layer of continuous filaments and other similar low melting sheets. Alternately the low-melting polyethylene adhesive film 653 is eliminated, and adhesive is added to the bottom surface after needle-punching. The adhesive is added in solid, powder or liquid form and is set without applying unduly high pressure to maintain bulk and cushion.

Figure 19:
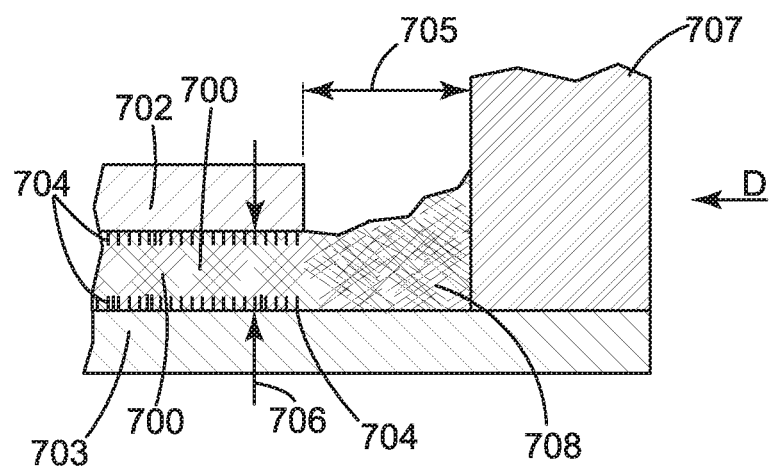
FIG. 19 is an illustration of a conventional fibrous layer spreading at an edge cut under lateral pressure.
Figure 20:
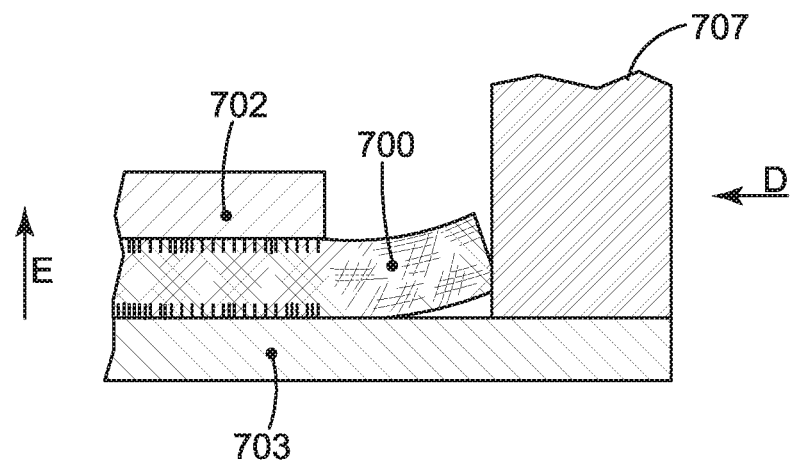
FIG. 20 is an illustration of a stabilized fibrous layer maintaining integrity and bending at an edge cut under layer pressure.

Referring now to FIGS. 19 and 20, an arrangement used to test the stability of the edges of a textile sheet structure prepared in accordance with exemplary embodiments is illustrated. In FIG. 19, the cut end of a conventional fibrous layer 700 is placed between a top plate 702 and a bottom plate 703. The conventional fibrous layer is prevented from moving between the top and bottom plates by a first part 704 of a two-part hook and look type fastener provided on the interior faces of the top and bottom plates. This first part of the hook and loop type fastener engages the first and second faces of the conventional fibrous layer. The depth 706 between top and bottom plates is set to equal the thickness of the sample 700 to avoid compacting the sample. A length 705 back from the cut edge 708 of the conventional fibrous layer extends past the top plate. This length is about twice a thickness 706 of the fibrous layer between the top and bottom plates. A moveable end force member 707 applies force to the cut edge in the direction of arrows D. As shown in FIG. 19, the cut edge of a conventional and insufficiently stabilized fibrous layer smashes or expands in thickness in response to this applied force.

Referring to FIG. 20, a cut end of fibrous layer 709 stabilized in accordance with exemplary embodiments subjected to the same applied force does not smash. Integrity of the cut end is maintained, and the cut end bends upward in the direction of arrow E.

Figure 21:
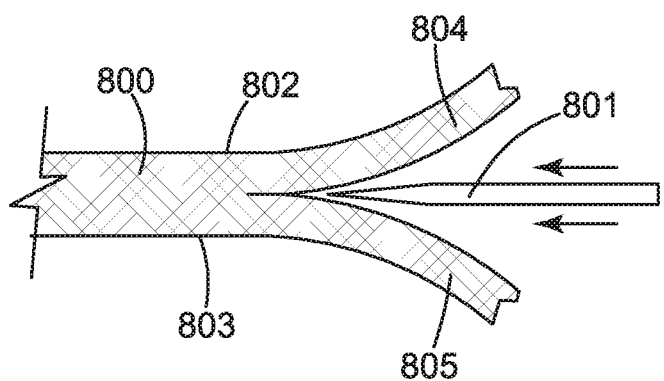
FIG. 21 is an illustration of a fibrous layer being cut with a knife.
Figure 22:
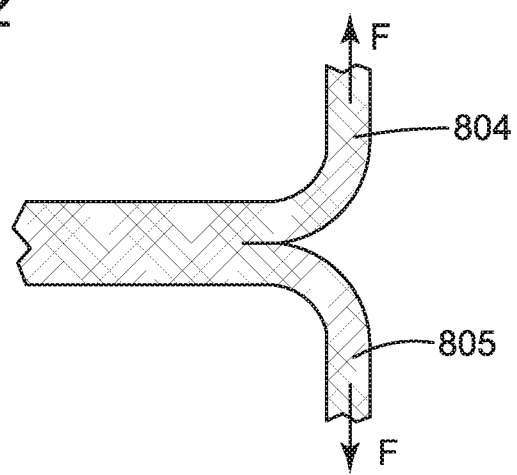
FIG. 22 is an illustration of a fibrous face layer having been cut with a knife delaminating into two separate sub-layers.

Referring to FIGS. 21 and 22, an arrangement used to measure the delamination resistance of a fibrous sample is illustrated. In FIG. 21, a conventional fibrous layer 800 of fibers that have not been sufficiently entangled and inter-bonded and that have a first face 802 and a second face 803 is subjected to a cutting edge 801 running between the first and second faces. This produces a first top portion 804 and a second bottom portion 805 that are easily separated from each other. Referring to FIG. 22 a fibrous layer or assembly stabilized in accordance with exemplary embodiments and pre-slit would not separate into two portions or layers. Force applied to the first and second portions of the stabilized fibrous layer made by the cutting edge, does not continue to separate until a sufficient level of force in the direction indicated by arrows F is reached.

Figure 23:
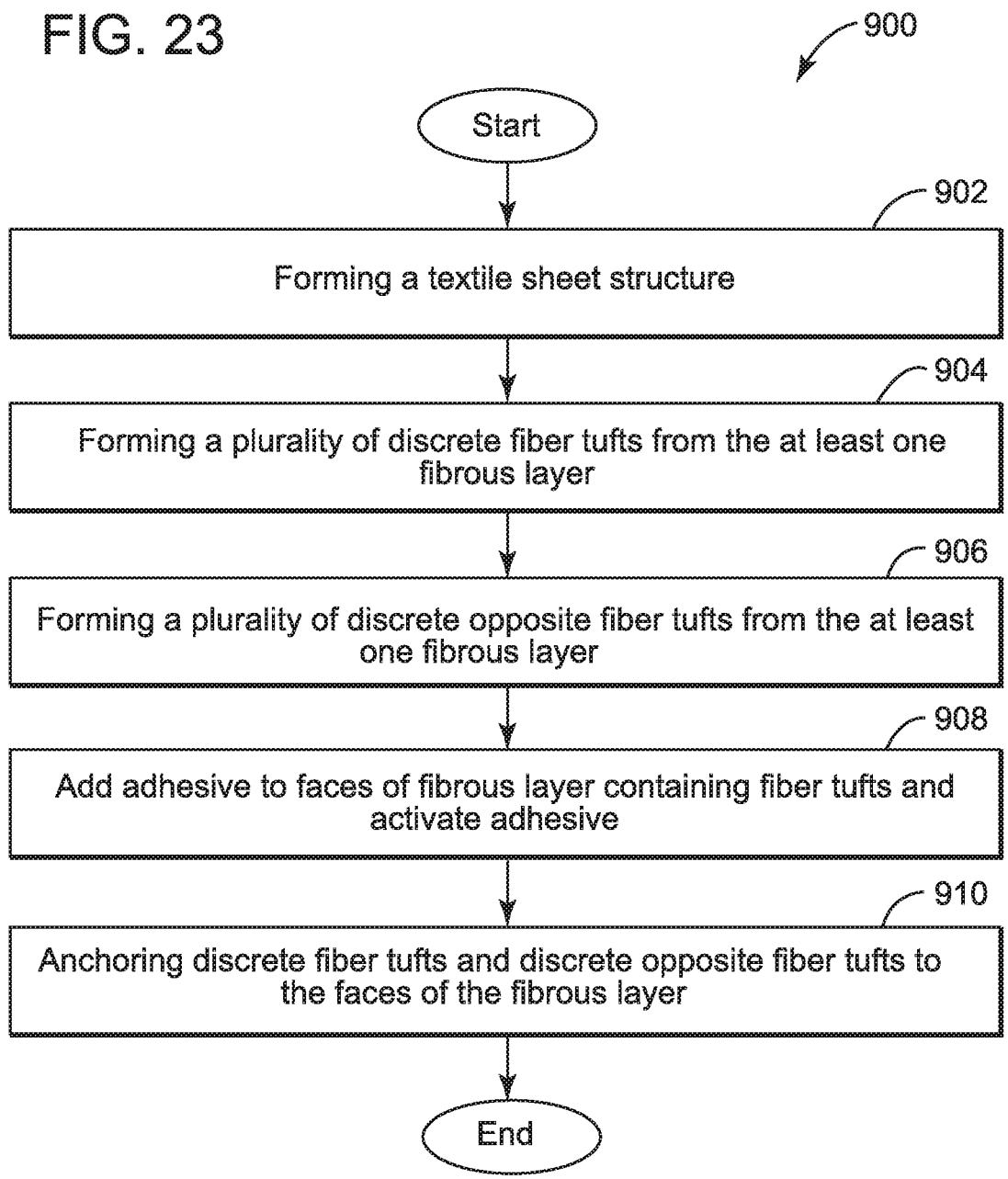
FIG. 23 is a flow chart illustrating an embodiment of a method for stabilizing a textile sheet structure.

Referring now to FIG. 23, exemplary embodiments are directed to a method for stabilizing a textile sheet structure 900. A textile sheet structure is formed 902. In one embodiment, the textile sheet structure is formed from at least one fibrous layer. A plurality of discrete fiber tufts is formed from the at least one fibrous layer 904. In one embodiment, the textile sheet structure includes a single fibrous layer, and a plurality of discrete fiber tufts is formed extending from a first face of the single fibrous layer of the textile sheet structure, through the fibrous layer and beyond a second face opposite the first face.

In one embodiment, the textile sheet structure is formed by combining a plurality of fibrous layers into a stack. The plurality of fibrous layers includes a top fibrous layer providing the first face and a bottom fibrous layer providing the second face. The plurality of discrete fiber tufts is formed to extend from the first face of the top fibrous layer of the textile sheet structure, through the plurality of fibrous layers and beyond the second face in the bottom fibrous layer. In one embodiment, the textile sheet structure is formed by combining two fibrous layers and placing at least one intermediate layer between the two fibrous layers. Suitable intermediate layers include, but are not limited to, a film, paper, scrim, nonwoven fabric, antifungal felt and combinations thereof. The plurality of discrete fiber tufts is formed to extend from the first face of the top fibrous layer of the textile sheet structure, through the top fibrous layer, the at least one intermediate layer and the bottom fibrous layer and beyond the second face in the bottom fibrous layer.

In one embodiment, forming the textile sheet structure includes forming a fibrous layer containing bi-component high-melt/low-melt fibers. As used herein, The bi-component high-melt/low-melt fibers are individual fibers that contain both high-melt polymer and low-melt polymer. Suitable polymers include polyester. For example, a low-melt polyester heath is formed around a high-melt polyester core. In one embodiment, the low-melt and high-melt, or normal-melt, are spun side by side. In one embodiment, the ratio of low-melt to high-melt is 50/50. These bi-component fibers can be included in the fibrous layer at about 10%, 15% or 20% of the total amount of fibers in the fibrous layer. Therefore, a fibrous layer blend of 80/20 contains 20% bi-component fibers or 10% low-melt polymer, and a fibrous layer blend of 90/10 contains 10% bi-component fibers or 5% low melt polymer. The plurality of discrete fiber tufts is formed such that each tuft includes a plurality discrete fibers containing the bi-component fibers and therefore the low-melt fibers.

A plurality of discrete opposite fiber tufts separate from the discrete fiber tufts are formed from the at least one fibrous layer 906. The discrete opposite fiber tufts extend from the second face through the fibrous layer or layers and beyond a first face. Each discrete fiber tuft and each discrete opposite fiber tuft includes a plurality of discrete fibers. The discrete fiber tufts and discrete opposite fiber tufts are formed to extend beyond the second face or first face of each fibrous layer a distance up to about 16 mm.

In one embodiment, the plurality of discrete fiber tufts is formed by needle punching fibers disposed on the first face through the fibrous layer and beyond the second face with coarse needles, and the plurality of discrete opposite fiber tufts are formed by needle punching fibers disposed on the second face through the fibrous layer and beyond the first face with coarse needles. Each coarse needle includes a plurality of barbs, and each barb engages a plurality of fibers with each needle punch through the fibrous layer. When needle punching discrete fiber tufts and discrete opposite fiber tufts, needle punching is conducted at a density of needle penetrations in the fibrous layer of less than about 30 penetrations per $cm^2$.

When only discrete fiber tufts are formed, forming the plurality of discrete fiber tufts involves needle punching fibers disposed on the first face through the fibrous layer and beyond the second face with coarse needles. Again, each coarse needle contains a plurality of barbs, and each barb engages a plurality of fibers with each needle punch through the fibrous layer. In one embodiment, each coarse needle is a 25-gauge needle. Spacing among the coarse needles is maintained using a needle board containing the coarse needles spaced from each other by a distance of at least about 5 mm, preferably at least about 10 mm. In one embodiment, needle punching fibers with coarse needles involves needle punching at a density of needle penetrations in the fibrous layer of less than about 25 penetrations per $cm^2$, preferably less than about 20 penetrations per $cm^2$.

In one embodiment, forming the textile sheet structure includes adding a polymer layer to at least one of the first face and the second face of the fibrous layer or fibrous layers. The polymer layer has a polymer layer melting point that is lower than a fiber melting point of the fibers in the fibrous layer. Forming the plurality of discrete fiber tufts includes needle punching fibers disposed on the first face through the fibrous layer, beyond the second face and through the polymer layer with coarse needles. Similarly, forming the plurality of discrete opposite fiber tufts comprises needle punching fibers disposed on the second face through the fibrous layer, beyond the first face and through the polymer layer with coarse needles.

Each discrete fiber tuft includes a plurality discrete fibers. Suitable discrete fibers include long staple fibers and continuous-filament fibers. In one embodiment, a single fibrous layer, a plurality of fibrous layers or fibrous layer in combination with additional layers has a thickness between the first face and the second face, and the plurality of fibers includes staple fibers that have a length sufficient to leave a span along the needle-entrance surface, i.e., the first face or second face, penetrate through to the needle exit surface, i.e., the first face or the second face, and protrude by a substantial length beyond the needle exit surface. In one embodiment, adhesive is added to at least one of the first face and the second face after forming the plurality of discrete fiber tufts or discrete opposite fiber tufts, and the adhesive is activated 908.

The discrete fiber tufts and the discrete opposite fiber tufts are anchored to the faces of the fibrous layer or fibrous layers 910. When the textile sheet structure includes additional layers, the fiber tufts can be anchored to surfaces of the additional layers that are outside or that cover the faces of the fibrous layers. In one embodiment, each discrete fiber tuft is attached to the first face and the second face of the fibrous layer by joining together the plurality of discrete fibers in each discrete fiber tuft at the first face and the second face and bonding the joined plurality of discrete fibers in each discrete fiber tuft to the first face and the second face. Joining and bonding can be accomplished by a combination of heat, pressure and adhesive. Heat can be provided by a heated surface or via circulated heated air.

In one embodiment, each discrete opposite fiber tuft is anchored to the first face and the second face of the fibrous layer by joining together the plurality of discrete fibers in each discrete opposite fiber tuft at the first face and the second face and bonding the joined plurality of discrete fibers in each discrete opposite fiber tuft to the first face and the second face. Joining and bonding can be accomplished by a combination of heat, pressure and adhesive. Heat can be provided by a heated surface or via circulated heated air or radiation.

EXAMPLES

Examples of the various configurations of the textile sheet product as discussed herein were constructed and were stabilized using conventional methods and exemplary embodiments for stabilizing the textile sheet product as discussed herein. The conventionally stabilized textile sheet products were then compared to textile sheet products stabilized in accordance with exemplary embodiments discussed herein.

In a first example, a textile sheet structure containing a single fibrous layer as illustrated in FIG. 2 included a commercial carpet under-layer containing a mixture of re-cycled long and short fibers needle-punched sufficiently to provide cushion and a limited amount of surface and edge integrity with the aid of a small low melt content. Stabilization of the fibrous layer was first attempted through conventional bonding of the first face and second face by touching these faces with a clothes-iron heated to 400° F. Planar stability and surface stability were highly improved without losing cushion or thickness, but cut-edge stability and delamination resistance remained unchanged or unimproved. The cut edges continued to bulge (FIG. 19) when pushed and the sheet continued to be easy to separate and to continuously delaminate into two continuous layers (FIGS. 21-22) with negligible effort.

The single fibrous layer was successfully stabilized with needle punching using coarse 25 gauge triangular needles with deep barbs, as illustrated in FIG. 2. The coarse needles were spaced at least 12.7 mm (½ inch) apart, entering through the top face with a stroke pushing all of the needles approximately 15.9 mm (⅝ inch) beyond the opposite second face. All needle strokes totaled approximately 12 penetrations per sq. cm or 75 penetrations per sq. inch. Long tufts of fibers corresponding to each needle penetration were clearly visible on the second face. Heat at 400° F. was then applied to the two faces using a clothes-iron with minimum pressure. Each of the two faces were bonded. The fibers on the needle entrance or first face, including those representing the tail end of the fibers forming the protruding tufts visible on the opposite face, were bonded to each other and to the rest of the fibers along the surface of the first face. The fiber tufts protruding from the second face were flattened and bonded to each other and onto the second face. In this manner the two thinly bonded surfaces were interconnected. Cut-edge stability was dramatically improved, as it was difficult to pull the structure open at the edges or corners. As per FIG. 20, the entire sheet tended to bend out-of-plane without changing thickness at the edge when pushed at the cut edges. The cut edges could not be split into two layers by hand, and when an edge was slit into two layers with a sharp knife as per FIG. 21 to allow the application of tension, one of the two sub-layers broke rather than allow continuous peeling. The overall thickness of the fibrous layer was reduced by less than 2%, and there was no perceptible loss of cushion.

In a second example, the fibrous layer of the first example was stabilized by sequentially needle punching the fibrous layer from both faces with the same type of needles, frequency and spacing, accumulating approximately 10 penetrations per sq. cm each time, followed by the same surface-heat treatment conditions as the in the first example but as illustrated by FIG. 3. The final thickness and cushion were essentially the same as in the case of one-sided needle punching. After heating the two surfaces to 400° F. and bonding the surface fibers and the emerging tufts on both faces, edge stability, delamination resistance, surface stability and planar stability were improved to the same levels as a single fibrous layer over-needled from one side.

In a third example, a lightweight needle-punched fibrous layer of blended fine/short and coarser/longer fibers was stabilized with minimum loss of thickness or bulk in the manner illustrated by FIG. 2. The fibrous layer was an unstable lightweight low-density felt containing 90% 1.5 denier/1.5 inch long polyester fibers blended with 10% 3.5 denier 2.5 inch bicomponent high-melt/low-melt fibers. The felt was originally formed by needling with finer 35 gauge needles, accumulating approximately 225 penetrations per sq. cm (1400 per sq. inch). Regardless of the relatively high needle-punching density the felt, as initially needle-punched, had highly unstable surfaces, with fibers easily pulling out. The felt had a thickness of 2.8 mm (0.11 inches), and the felt compressed to 1.5 mm (0.06 inches) and recovered back to its original thickness when repeatedly subjected to a 25 psi compression force. The felt was easily deformable, and the surfaces of the felt were readily separable. The cut edges readily bulged when subjected to lateral compression.

An attempt was made to stabilize this felt using a conventional method. The felt was directly subjected to light ironing at 375° F. with very low pressure on both faces. Surface stability and planar dimensional stability improved greatly, with a loss of only 0.25 mm (0.01 inches) in thickness. Nevertheless, cut-edge bulging and easy delamination of the two surfaces continued to be a problem. A second attempt at conventionally stabilizing held the felt for two minutes between two plates heated to 375° F. to activate all the low melt fibers and to inter-bond all layers. The plates were set at a gap of 2.8 mm (0.11 inches). After cooling the thickness and cushion were preserved and surface stability/abrasion resistance and planar stability substantially improved. Edge stability and delamination resistance showed only marginal improvement with continued edge-bulging and separation of the two faces. The gap during the heating process was then progressively reduced in stages until substantial and satisfactory improvement in edge stability and delamination resistance was observed with a gap down to 1.5 mm (0.06 inches), at which point the final thickness was unacceptably reduced to 1.65 mm (0.065 inches) and the cushion to 1 mm (0.04 inches) at 25 psi.

A third conventional attempt to improve stability subjected the felt to additional needling with the 35 gauge original needles, gradually adding up to a total of 400 penetrations per sq. cm per side, followed by low-pressure surface bonding. A minimum of 350 additional penetrations per sq. cm (2,200 per sq. inch) prior to surface bonding were required to eliminate edge bulging and substantially improve delamination resistance. This level of additional needling reduced the thickness to 1.3 mm (0.05 inches) and compression at 25 psi to 6.35 mm (0.25 inches), representing an unacceptable loss of approximately 50%.

The same felt was successfully stabilized, with minimal loss of thickness and cushion using coarse 25 gauge needles with a total additional accumulation of only 15 penetrations per sq. cm (94 per sq. inch), followed by lightly bonding the two faces. The final thickness was only slightly reduced from the original 2.8 mm (0.11 inches) to approximately 2.54 mm (0.1 inches), and the product was stabilized with no tendency to bulge at the cut edges or to delaminate without breaking the pre-separated layers. Cushion remained high, with a recoverable compression of 1.3 mm (0.05 inches) at 25 psi.

In a fourth example, a textile sheet structure containing two fibrous layers was needle-punched into one stable textile sheet structure in the manner illustrated by FIGS. 6-8. Each layer weighed 33 oz./sq. yd., had a thickness of 7 mm (0.275 inches), and contained 80% 3.5 inch long 15 dpf polyester fibers and 20% 3.5 inch long 3.5 dpf low melt/high melt polyester fibers. Each layer had been needle-punched with approximately 1000 penetrations per sq. inch (160/sq. cm). In each individual layer, the edges were stable and free of bulging, and delamination resistance was satisfactory, with minimum progression of delamination after making an edge slit and applying a force over 10 lbs.

To obtain an equally stable composite with deeper cushion and higher shock absorption, attempts at combining the two layers by conventional needle-punching together using the same fine 35 gage entangling-needles originally used in the preparation of the individual felts were made. In one attempt, needle-punching was performed through only one face. In a second attempt, needle-punching was performed on both exterior faces of the two layers of felts. Needle punching added 15 penetrations per sq. cm per side per step. The number of steps was progressively increased for each subsequent sample. After each single or multiple needle-punching step no multi-fiber tufts were observed emerging from faces opposite the faces where the needles were inserted, with only occasional individual fibers showing through. All samples were surface bonded with light ironing both faces at 375° F. While surface stability and planar dimensional stability for the combined felts remained satisfactory, substantial delamination resistance between the two original felts was not attained until the total additional number of penetrations reached approximately 300 penetrations per sq. cm or nearly 1900 penetrations per square inch. At this level of penetrations, overall thickness was reduced from a total of 1.3 mm (0.05 inches) to the range of from about 10.9 mm (0.43 inches) to about 11.4 mm (0.45 inches). This represented an average loss of nearly 20%. In addition, average cushion at 25 psi was in the range of about 17.8 mm (0.7 inches) to about 20.3 mm (0.08 inches), only 0.4 mm (0.015 inches) or 23% above the cushion of a single initial layer.

The two layers of felt were then successfully joined and stabilized using coarse needle punching by needling from one face or form both faces and applying heat from both sides as illustrated by FIGS. 7 and 8. The average total final thickness of the combined samples needled from one side was in the range of about 13.5 mm (0.53 inches) to about 13.7 mm (0.54 inches). For the samples needled from both sides, the total final thickness was in the range of about 13.6 mm (0.535 inches) to about 13.8 mm (0.545 inches). These ranges represent an average negligible loss under 1%. The cut edges securely closed and did not bulge when planarly forced. The layers could only be separated by cutting the connecting fibers with a flat knife edge. Once separated, they required an estimated force of over 8 lbs per inch of width to break the connecting fibers and allow some discontinuous and non-uniform delamination. Cushion was approximately 2.7 mm (0.105 inches), an increase of 75% over the cushion rating of a single layer.

In a fifth example, a textile sheet structure encapsulating a non-fibrous/non-bonding shock-absorbing layer between two fibrous layers was formed as illustrated in FIGS. 10 and 11. A layer of 0.13 mm (0.005 inch) thick polyester film was inserted between the two felts. Each felt layer weighed 33 oz./sq. yd., had a thickness of 7 mm (0.275 inches), and contained 80% 3.5 inch long 15 dpf polyester fibers and 20% 3.5 inch long 3.5 dpf low melt/high melt polyester fibers. Each layer had been needle-punched with approximately 1000 penetrations per sq. inch (160/sq. cm). The polyester film was added to obtain better cushion and shock absorption by creating a "trampoline effect" and spreading vertical stress sidewise.

Before re-needle-punching, the combined two layers of felt and the single layer of film had a thickness of approximately 14.6 mm (0.575 inches). After needle punching from either one face or both faces and bonding the two outer faces of each with heat, the final composites had a thickness of about 14.7 mm (0.58 inches) and about 14.6 mm (0.575 inches) and showed no loss of bulk. There was no bonding between the felt layers to the polyester film. However, the edges were surprisingly stable, and delamination resistance was equivalent to that of examples using just the two felt layers without a separating mid-layer. In addition, cushion was higher than the cushioning level of the composites with only the two felts layers at 3 mm (0.12 inches) and essentially twice that of a single felt layer.

In a sixth example, a textile sheet structure was used that encapsulated a dispersed recyclable layer including short fibers within two fibrous layers as illustrated, for example, in FIG. 12. A mid-layer composed of chopped floorcovering fibers was encapsulated between two felts. Each felt layer weighed 33 oz./sq. yd., had a thickness of 7 mm (0.275 inches), and contained 80% 3.5 inch long 15 dpf polyester fibers and 20% 3.5 inch long 3.5 dpf low melt/high melt polyester fibers. Each outer layer had been needle-punched with approximately 1000 penetrations per sq. inch (160/sq. cm).

The dispersed floorcovering had originally been prepared using the process disclosed in U.S. Pat. No. 8,218,659 by laminating a stitchbonded fabric onto a polyester felt, and subsequently chopping and dispersing by the process disclosed in U.S. Pat. No. 7,514,026, using a single-stage disperser device. The dispersion contained approximately 58% 15 denier polyester fibers, 17% polyester yarns composed of 6 dpf filaments, 6% 3.5 dpf bicomponent low-melt/high-melt polyester fibers, and 19% polyethylene. The dispersed fiber lengths were generally below 12.7 mm (0.5 inches) and mostly below 6.35 mm (0.25 inches). The polyethylene was in the form of particles mostly smaller than 1.3 mm (0.05 inches), and the entire dispersion was loose and non-cohesive. With the fibrous layers positioned on the top and bottom of the mid-layer and the thickness of the two felts totaling approximately 14 mm (0.55 inches), the overall thickness of the assembly was approximately 15.7 mm (0.62 inches). The recycled mid-layer was approximately 3.3 mm (0.13 inches) thick and weighed 15 oz./sq. yd., constituting 18% of the total weight of the textile sheet product.

In a conventional effort to join the three layers with minimum loss of thickness and cushion and encapsulate the loose fibers, additional needle punching was applied using the original fine 35 gauge needles used in producing the felts. This additional needle punching was conducted from one side and both sides, progressively rising to a total of 210 added penetrations per sq. cm, or 1300 per sq. inch. Loose fibers from cut edges were eliminated, but acceptable edge stability and delamination resistance were not achieved until the added cumulative penetration was raised to 340 penetrations per sq. cm, totaling an extra penetration accumulation near 2200 per sq. inch. At this point, the composite thickness was reduced considerably below the sum of the thickness of the two original surrounding felts to 11.6 mm (0.455 inches). In addition, cushion was dramatically and unacceptably reduced to a recoverable compression under the level of a single original felt, to 1.8 mm (0.07 inches).

When the three-layer assembly was instead subjected to over-needling with the coarse needles and surface bonding of the fiber tufts in accordance with exemplary embodiments as illustrated in FIG. 13, overall thickness was reduced to 15 mm (0.59 inches), with most of the loss of thickness due to the compression of the mid-layer. The edges were stable against lateral pressing, and the textile sheet structure was resistant to delamination by hand. Once separated by inserting a sharp blade between the layers, the combined sample had an estimated delamination resistance over 9 lbs per inch of width. The mid-layer along the cut edges had an occasional tendency to lose short fibers or for fibrils to come loose along a cut-edge.

Loose fibers along the cut edges from dispersed mid-layer fibers were eliminated by lightly pre-compressing layer with heat at 375° F. applied from both sides for approximately 30 seconds to obtain a semi-coherent layer before inserting the mid-layer between the felt layers. The compressed mid-layer had a thickness of approximately 1.65 mm (0.065 inches). The needle-punching and surface heating process described above was repeated to combine all three layers. Total thickness was reduced to 14.2 mm (0.56 inches), representing a negligible loss compared to the combined initial thicknesses of the three layers prior to needle-punching (585 inches). Surface stability, edge stability and delamination resistance improved to the same levels as in the fibrous layers containing the polyester film. In addition, the tendency of fibers being released from the mid layer along cut edges was eliminated. Cushion remained high at 3.2 mm (0.125 inches).

In a seventh example, a felt and a stabilizing layer were integrated onto the back of a pre-formed textile face structure as illustrated, for example, in FIG. 16. The composite backing including a cushioning structure, a stabilizing layer and a dual adhesive layer was prepared and could be combined with a pre-formed textile face fabric using heat and light pressure from above and below without inducing a significant loss of thickness or cushion. The composite backing was prepared by using a cushioning structure containing the same type of felts as described in the other examples. The stabilizing-layer was a fiberglass nonwoven layer weighing 7 oz./sq. The adhesive layer included two layers of low density polyethylene film. The preformed face layer was prepared by tufting into a polyester backing in a linear pattern.

A first conventional direct thermal laminating attempt was made by applying heat from the pile face. The four layers were placed in a press with the platen against the pile face heated to 375° F., and the opposite platen contacting face maintained at room temperature. A series of samples were prepared starting with the application of 250 psi for 5 seconds to the first sample, which did not produce a bonded composite that could be tested, and stepwise adding an extra 250 psi and 5 seconds for each subsequent sample. Marginally bonded samples were obtained starting at the combinations of 1,000 psi and 5 seconds or 500 psi and 15 seconds. In both cases the backing and pile were crushed unacceptably to less than one half of their original thicknesses, and the layers were still separable by applying less than 3 lbs per inch of width. Pulling the tufts out from the upper pile face required an unacceptably low force of only 1-2 lbs.

Additional coarse needle punching was first applied to the lower three layers as illustrated by FIG. 15 by needle-punching with 25 gauge needles through the bottom of cushioning felt and accumulating 18 penetrations per sq. cm with an equal number of multifiber tufts protruding through the dual adhesive layer, accumulating approximately 18 penetrations per sq. cm. Attachment of the fiber tufts was accomplished as illustrated in FIG. 16 by first bonding the surface of the fibrous layer opposite the fiber tufts with very low pressure and 375° F. heat for five seconds, and then placing the face fabric over the protruding tufts and applying a pressure of approximately 100 psi from above at 375° F. for a total of 10 seconds. The protruding tufts engaged the underlaps of the tufted face layer, and the two were enveloped by the molten polyethylene of the adhesive layer, which also reached the primary backing of the face layer. Delamination resistance improved to approximately 6 lbs per inch, and the cut edges of the textile sheet product were stable. Tuft pull-out resistance increased to approximately 6 lbs, qualifying the composite as a floorcovering useful under mild wear conditions. Pile height was reduced by only 16% from 4.77 mm (0.188 inches) to 3.9 mm (0.155 inches), while the thickness of fibrous backing layer was reduced by only 10% from the original 7 mm (0.275 inches) to 6 mm (0.235 inches).

In an eighth example, multiple non-fibrous layers were combined using fibers originating from a single fibrous face layer as illustrated, for example, in FIG. 17. A lightly needle-punched fibrous layer containing a blend of 80% 3.5 inch long 15 denier polyester staple fibers and 20% bi-component low/high melt 3.5 inch polyester staple fibers was used to combine a total of five layers to produce a resilient shock-absorbing and planarly-stable textile sheet product serving as a cushion sheet with a printable fibrous face. A thin but stiff 0.003 mil thick polyester film intended as a stress-distributing shock absorber and planar stiffener was placed under the fibrous layer and over a 12.7 mm (0.5 inch) thick commercial polyurethane foam cushioning layer. A high-melting 0.025 mm (0.001 inch) thick 96 gauge polyester film layer was placed under the foam layer to protect the foam layer from heat. A 0.1 mm (0.004 inch) thick low-melting polyethylene adhesive film was placed underneath the high-melting polyester film. The thickness of all superposed layers was about 15.4 mm (0.608 inches). The recoverable cushion of the stacked layers was approximately 6.4 mm (0.25 inches).

The stacked layers were needled with 25 gauge needles accumulating approximately 20 penetrations per sq. cm, yielding multifiber tufts extending beyond the bottom of adhesive sheet by approximately 6.4 mm CA inches) to about 12.7 mm (½ inches). The two faces were then bonded by applying 420° F. heat and very low pressure, sufficient to flatten and interbond the fibers in the fiber tufts and on the face and to flatten the fiber tufts onto the molten adhesive sheet. At this penetration density, the flattened fiber ends of the fiber tufts connected sufficiently with each other within the molten layer to form a highly coherent bottom surface. The textile sheet product was approximately 14 mm (0.55 inches) thick and had a high level of recoverable cushion of 7.1 mm (0.28 inches). Edge stability and delamination resistance were equivalent to the preceding examples of the invention despite the observation that the layers of polyester were not inter-bonded to the polyethylene layers due to the lack of compatibility of polyester and polyethylene. The layers of polyester were also not inter-bonded to the foam layer they enclosed.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for stabilizing a textile sheet structure, the method comprising:
    forming in a fibrous layer comprising adhesively un-bonded fibrous faces comprising a first face and a second face opposite the first face, a plurality of discrete fiber tufts extending beyond the second face, each discrete fiber tuft comprising a plurality of discrete fibers, each discrete fiber in the plurality of discrete fibers continuously extending along the first face of a fibrous layer of the textile sheet structure, through the fibrous layer, and beyond the second face opposite the first face, the first face comprising adhesively un-bonded fibers laying along the first face and the second face comprising fibers laying along the second face; and
    anchoring the plurality of discrete fibers extending along the first face to the first face of the fibrous layer and the discrete fibers in each discrete fiber tuft to the second face of the fibrous layer by:
    collapsing portions of the fiber tufts protruding beyond the second face against the second face to
    place the discrete fibers in the portions of the collapsed fiber tufts against the second face; and
    adhesively bonding the plurality of discrete fibers extending along the first face to fibers laying along the first face and the discrete fibers in the portions of the fiber tufts collapsed and placed against the second face to fibers laying along the second face.

2. The method of claim 1, wherein the plurality of discrete fibers comprises staple fibers or continuous-filament fibers.

3. The method of claim 1, wherein:
    the fibrous layer comprises a thickness between the first face and the second face; and
    each fiber in the plurality of discrete fibers comprises a length sufficient to span along the first face, through the thickness of the layer and beyond the second face.

4. The method of claim 1, wherein forming the plurality of discrete fiber tufts comprises forming a plurality of discrete fiber tufts comprising discrete fibers extending beyond the second face a distance of at least about 16 mm.

5. The method of claim 1, wherein forming the plurality of discrete fiber tufts comprises needle punching fibers disposed on the first face through the fibrous layer and beyond the second face with coarse needles, each coarse needle comprising a plurality of barbs and each barb engaging a plurality of fibers with each needle punch through the fibrous layer.

6. The method of claim 5, wherein each coarse needle comprises a 25-gauge or coarser needle.

7. The method of claim 5, wherein needle punching fibers with coarse needles comprises using a needle board comprising the coarse needles spaced from each other by a distance of at least about 5 mm.

8. The method of claim 7, wherein the coarse needles are spaced from each other by a distance of at least about 10 mm.

9. The method of claim 5, wherein needle punching fibers with coarse needles comprises needle punching at a density of needle penetrations in the fibrous layer of less than about 25 penetrations per $cm^2$.

10. The method of claim 5, wherein needle punching fibers with coarse needles comprises needle punching at a density of needle penetrations in the fibrous layer of less than about 20 penetrations per $cm^2$.

11. The method of claim 1, wherein the method further comprises:
forming a plurality of discrete opposite fiber tufts separate from the discrete fiber tufts and comprising a plurality of discrete opposite fibers, each discrete opposite fiber in the plurality of discrete opposite fibers continuously extending along the second face through the fibrous layer and beyond the first face; and
anchoring the discrete opposite fibers running along the second face to the second face of the fibrous layer and the discrete opposite fibers in each discrete opposite fiber tuft to the first face of the fibrous layer by:
collapsing portions of the opposite fiber tufts protruding beyond the first face against the first face to place the discrete opposite fibers in the portion of the discrete opposite fiber tufts collapsed against the first face; and
adhesively bonding the plurality of each discrete opposite fibers to fibers laying along the first face.

12. The method of claim 11, wherein:
forming the plurality of discrete fiber tufts comprises needle punching fibers disposed on the first face through the fibrous layer and beyond the second face with coarse needles;
forming the plurality of discrete opposite fiber tufts comprises needle punching fibers disposed on the second face through the fibrous layer and beyond the first face with coarse needles;
each coarse needle comprises a plurality of barbs and each barb engages a plurality of fibers with each needle punch through the fibrous layer; and
needle punching fibers with coarse needles comprises needle punching at a density of needle penetrations in the fibrous layer of less than about 30 penetrations per $cm^2$.

13. The method of claim 12, wherein:
the method further comprises adding an adhesive layer to at least one of the first face and the second face, the adhesive layer comprising a polymer layer with a melting point that is lower than the melting point of the fibers in the fibrous layer; and
forming the plurality of discrete fiber tufts comprises needle punching fibers disposed on the first face through the fibrous layer, beyond the second face and through the polymer layer with coarse needles;
forming the plurality of discrete opposite fiber tufts comprises needle punching fibers disposed on the second face through the fibrous layer, beyond the first face and through the polymer layer with coarse needles.

14. The method of claim 1, wherein:
the method further comprises combining a plurality of fibrous layers into a stack comprising a top fibrous layer comprising the first face and a bottom fibrous layer comprising the second face; and
forming the plurality of discrete fiber tufts comprises forming the plurality of discrete fiber tufts extending along the first face of the top fibrous layer of the textile sheet structure, through the plurality of fibrous layers and beyond the second face in the bottom fibrous layer.

15. The method of claim 14, wherein:
the plurality of fibrous layers comprises two fibrous layers;
the method further comprises placing at least one intermediate layer between the two fibrous layers; and
forming the plurality of discrete fiber tufts comprises forming the plurality of discrete fiber tufts extending along the first face of the top fibrous layer of the textile sheet structure, through the top fibrous layer, the at least one intermediate layer and the bottom fibrous layer and beyond the second face in the bottom fibrous layer.

16. The method of claim 15, wherein the at least one intermediate layer comprises a film, paper, scrim, nonwoven fabric, woven fabric, antifungal layers, antimicrobial layers, felts or combinations thereof.

17. The method of claim 1, wherein:
the fibrous layer comprises bi-component fibers comprising individual fibers comprising both high-melt polymer and low-melt polymer; and
forming the plurality of discrete fiber tufts comprises forming the plurality of discrete fiber tufts where the plurality of discrete fibers in each fiber tuft comprises the bi-component high-melt/low-melt fibers.

18. The method of claim 1, wherein the method further comprises:
adding adhesive to at least one of the first face and the second face after forming the plurality of discrete fiber tufts; and
activating the adhesive.

19. The method of claim 1, wherein:
the method further comprises placing an additional layer against the second face; and
each discrete fiber extends along a first face of a fibrous layer of the textile sheet structure, through the fibrous layer, beyond the second face opposite the first face and through the additional layer.

20. The method of claim 19, wherein the additional layer comprises a film or a nonwoven layer.

21. The method of claim 19, wherein the additional layer comprises a woven textile, a knit textile, a tufted textile, a nonwoven textile, a flocked textile, a stitchbonded textile, a bonded nonwoven textile, an entangled nonwoven textile or a solid film scrim.

22. A stabilized textile sheet structure made by the process of:
forming a fibrous layer comprising fibrous faces comprising a first face and a second face opposite the first face, the first face comprising fibers laying along the first face and the second face comprising un-bonded fibers laying along the second face, and a plurality of discrete fiber tufts, each discrete fiber tuft comprising a plurality of discrete fibers and each discrete fiber in the plurality of discrete fibers continuously extending along the first face, through the fibrous layer and beyond the second face;

collapsing portions of the fiber tufts protruding beyond the second face against the second face to place individual discrete fibers in the plurality of discrete fiber tufts collapsed against the second face; and adhesively bonding the plurality of discrete fibers extending along the first face to otherwise adhesively un-bonded fibers laying along the first face and in the portions of the fiber tufts collapsed and placed against the second face to otherwise adhesively un-bonded fibers laying along the second face to anchor each discrete fiber extending along the first face to the first face of the fibrous layer and each discrete fiber tuft to the second face of the fibrous layer.

23. The stabilized textile sheet structure of claim 22, wherein:

forming the fibrous layer further comprises forming a plurality of discrete opposite fiber tufts separate from the discrete fiber tufts and comprising a plurality of discrete opposite fibers, each discrete opposite fiber in the plurality of discrete opposite fibers continuously extending along the second face through the fibrous layer and beyond a first face; and the stabilized textile sheet structure is further made by collapsing portions of the discrete opposite fiber tufts protruding beyond the first face against the first face to place individual discrete opposite fibers in the collapsed portion of the discrete opposite fiber tufts against the first face, and adhesively bonding the joined plurality of discrete opposite fibers to fibers laying along the first face or second face to anchor each discrete opposite fiber running along the second face to the second face of the fibrous layer and each opposite fiber tuft to the first face of the fibrous layer.

* * * * *